United States Patent
Zietlow

(10) Patent No.: US 9,692,069 B2
(45) Date of Patent: Jun. 27, 2017

(54) PROCESSES AND SYSTEMS FOR STORING, DISTRIBUTING AND DISPATCHING ENERGY ON DEMAND USING AND RECYCLING CARBON

(71) Applicant: Zietlow Innovative Engineering and Technology, LLC, Savage, MN (US)

(72) Inventor: Douglas A. Zietlow, Savage, MN (US)

(73) Assignee: ZIET, LLC, Savage, MN (US)

( * ) Notice: Subject to any disclaimer, the term of this patent is extended or adjusted under 35 U.S.C. 154(b) by 6 days.

(21) Appl. No.: 14/214,647

(22) Filed: Mar. 14, 2014

(65) Prior Publication Data

US 2014/0272639 A1  Sep. 18, 2014

Related U.S. Application Data

(60) Provisional application No. 61/794,217, filed on Mar. 15, 2013.

(51) Int. Cl.
*H01M 8/00* (2016.01)
*C01B 31/02* (2006.01)
(Continued)

(52) U.S. Cl.
CPC .......... *H01M 8/0656* (2013.01); *C01B 31/02* (2013.01); *C01B 31/18* (2013.01); *C01B 31/20* (2013.01);
(Continued)

(58) Field of Classification Search
CPC ................. H01M 8/0656; H01M 8/18; H01M 2008/147; H01M 2008/1293;
(Continued)

(56) References Cited

U.S. PATENT DOCUMENTS 3,810,365 A    5/1974    Hampton et al.
3,861,885 A    1/1975    Schora
(Continued)

FOREIGN PATENT DOCUMENTS

CN    101337672 A    1/2009
CN    201865710 U    6/2011
(Continued)

OTHER PUBLICATIONS

Kids' Crossing [Kids'] (Wayback Machine online evidence Nov. 11, 2004 {https://eo.ucar.edu/kids/green/cycles6.htm}).*
(Continued)

*Primary Examiner* — Patrick Ryan
*Assistant Examiner* — Aaron Greso
(74) *Attorney, Agent, or Firm* — O'Connor & Company

(57) ABSTRACT

The present invention generally relates to storing energy in a form that is carbon neutral, storable and transportable, so that it can be used on demand. The present invention provides a process and system for using energy as available to produce carbon from carbon oxide, and then oxidizing the carbon to generate useful energy on demand, while effectively recycling the carbon, oxidant, and carbon oxide used in the process or system. In one embodiment, the present invention effectively stores renewable energy as carbon, transports the carbon, oxidizes the carbon to generate useful energy on demand and recycles the carbon as carbon dioxide. This invention may increase the utilization of renewable energy, especially for electrical power generation, while producing no net carbon dioxide or other air pollutants.

46 Claims, 5 Drawing Sheets

(51) Int. Cl.

| | |
|---|---|
| *C01B 31/18* | (2006.01) |
| *C01B 31/20* | (2006.01) |
| *H01M 8/0656* | (2016.01) |
| *H01M 8/18* | (2006.01) |
| *H01M 8/124* | (2016.01) |
| *H01M 8/14* | (2006.01) |

(52) U.S. Cl.
CPC ...... *H01M 8/18* (2013.01); *H01M 2008/1293* (2013.01); *H01M 2008/147* (2013.01); *H01M 2250/00* (2013.01); *Y02E 20/18* (2013.01); *Y02E 60/526* (2013.01); *Y02E 60/528* (2013.01)

(58) Field of Classification Search
CPC .. H01M 2250/00; Y02E 60/50; Y02E 60/526; Y02E 60/525; Y02E 20/18; C01B 31/18; C01B 31/20; C01B 31/02
See application file for complete search history.

(56) References Cited

U.S. PATENT DOCUMENTS

| | | | | |
|---|---|---|---|---|
| 4,828,581 | A * | 5/1989 | Feldmann | C10J 3/12 48/197 R |
| 5,470,378 | A * | 11/1995 | Kandybin | B01D 53/047 95/100 |
| 5,665,319 | A | 9/1997 | Hirama et al. | |
| 5,937,652 | A * | 8/1999 | Abdelmalek | C10J 3/54 60/648 |
| 5,973,652 | A * | 10/1999 | Sanford | H01Q 13/0208 343/781 CA |
| 6,270,731 | B1 | 8/2001 | Kato et al. | |
| 2005/0095183 | A1* | 5/2005 | Rehmat | C01B 3/382 422/600 |
| 2009/0013593 | A1 | 1/2009 | Young | |
| 2009/0016948 | A1 | 1/2009 | Young | |
| 2010/0018218 | A1 | 1/2010 | Riley et al. | |
| 2010/0146927 | A1 | 6/2010 | McCutcheon et al. | |
| 2011/0070510 | A1 | 3/2011 | McAlister | |
| 2011/0260112 | A1 | 10/2011 | Wijmans et al. | |
| 2011/0290162 | A1 | 12/2011 | Jeon | |

FOREIGN PATENT DOCUMENTS

| | | | | |
|---|---|---|---|---|
| CN | 202485229 | U | 10/2012 | |
| CN | 102764577 | A | 11/2012 | |
| CN | 103357265 | A | 10/2013 | |
| DE | 102007012438 | * | 9/2008 | ............ C10B 53/02 |
| DE | 102009048541 | A1 | 4/2011 | |
| GB | 2449233 | * | 11/2008 | ............ C01B 31/02 |
| JP | H11-037444 | * | 2/1999 | ................ F23J 1/00 |
| RU | 2437914 | C2 | 12/2011 | |
| WO | 0027951 | A1 | 5/2000 | |
| WO | 2005047435 | A2 | 5/2005 | |
| WO | 2007074304 | A1 | 7/2007 | |
| WO | 2011050437 | A1 | 5/2011 | |

OTHER PUBLICATIONS

Ehrensberger, et al., Production of Carbon from Carbon Dioxide with Iron Oxides and High-Temperature Solar Energy, Ind. Eng. Chem. Res., 1997, pp. 645-648, 36, American Chemical Society, USA.

Eisaman, et al., Carbon-neutral liqiud fuel from sunlight, air, and water, Gordon Research Conference on Renewable Energy: Solar Fuels; Feb. 1-6, 2009; Ventura, CA, http://www.parc.com/publication/2175/carbon-neutral-liquid-fuel-from-sunlight-air-and-water.html.

Fukuda, et al., Dissociation of carbon dioxide and creation of carbon particles and films at room temperature, New Journal of Physics, Sep. 10, 2007, pp. 1- 11, vol. 9, issue 321, IOP Science, United Kingdom, http://iopscience.iop.org/1367-2630/9/9/321.

Kanakam, et al., Recycling of Carbon Dioxide to Provide Renewable Energy and for the Mitigation of Green House Gas Emissions, International Proceedings of Chemical, Biological and Environmental Engineers, 2nd International Conference on Environmental Science and Technology, 2011, pp. 257-260, vol. 6, No. 1, IACSIT Press, Singapore.

Miller, Why not split harmful carbon dioxide into harmless carbon and oxygen?, Scientific American, Jul. 9, 2009, p. 44, Scientific American, Division of Nature America, Inc., USA, http://www.scientificamerican.com/article.cfm?id=splitting-carbon-dioxide.

* cited by examiner

PROCESSES AND SYSTEMS FOR STORING, DISTRIBUTING AND DISPATCHING ENERGY ON DEMAND USING AND RECYCLING CARBON

PRIORITY DATA

This patent application claims the priority benefit of U.S. Provisional Patent Application No. 61/794,217, entitled "Process for Storing, Distributing and Dispatching Energy On Demand Using and Recycling Carbon," filed on Mar. 15, 2013, which is hereby incorporated by reference herein in its entirety.

FIELD OF THE INVENTION

The present invention generally relates to processes and systems for the transformation of energy as available into a form that is storable, distributable, and dispatchable as energy on demand.

BACKGROUND OF THE INVENTION

Existing energy production is based largely on combustion of carbon-based fuels derived from coal, crude oil, and natural gas. Although the earth has large deposits of these resources, their use is irreversible. In addition, one of the products of combustion is carbon dioxide, which is currently thought to have negative effects on the earth's climate. Because coal, crude oil, and natural gas have impurities, their refining and use also generate pollutants, most notably mercury (primarily from coal), sulfur oxides, and nitrogen oxides.

Nuclear fission is an alternative source for producing energy. Under normal circumstances, it does not produce carbon dioxide or other air pollutants. However, it does generate dangerous, highly toxic waste that is difficult to manage. In addition, catastrophic failures can render large areas of air, water, and land contaminated and unusable for long time periods, from years to decades.

Renewable energy sources, such as biomass, wind, solar, and geothermal energy, are constantly being replenished or produced in nature. Biomass, wind, and solar energy are all directly or indirectly produced from solar radiation. Geothermal energy is produced by thermal energy stored within the earth. These energy sources are practically inexhaustible. In addition, these energy sources do not inherently generate carbon dioxide or air pollutants by their use. Hence, renewable energy sources are attractive because they can potentially provide a sustainable, clean supply of energy.

Unfortunately, most renewable sources are not available when and where energy is most needed. Currently the only effective means for transporting energy long distances, other than fossil fuels, is as electricity. Existing electricity technology, i.e. batteries, is expensive and even less efficient, and transporting electricity stored in batteries long distances is currently impractical. Therefore, transporting renewable energy is limited by the transmission capabilities of the electric grid. Utilizing renewable energy that is remotely located from areas of greatest demand may not be feasible using processes in the prior art.

Moreover, the times of greatest renewable generation and greatest demand may not be the same. In some cases, the difference in time between greatest renewable generation and greatest demand can be half a year. There may be some means for converting electricity for storage for times this long, but the problem of electrical transmission capacity in real time still applies unless the stored energy can be feasibly be transported. This lack of technically and economically feasible energy conversion and storage for renewable energy, especially for electricity, requires building excess conventional electric-generating capacity that is underutilized to ensure that electric demand is satisfied at all times, while maximizing the use of renewable energy.

In addition, the location, time, and rate of available renewable energy cannot be controlled. For instance, wind and solar power are intermittent and their rate depends on the intensity of wind or solar radiation. Furthermore, the location, time, and rate of energy demand do not generally match that of available renewable energy. For instance, the locations of greatest wind and solar power generation potential are often distant from the locations of greatest energy demand, and the season of greatest renewable energy production is often different from that of greatest energy demand. Therefore, meeting energy demand at all times requires having conventional generation capacity equal to the maximum coincident difference between demand and available renewable energy. When the difference between demand and available renewable energy is less than maximum, which is most of the time, conventional generation capacity will be underutilized.

In some cases, renewable energy cannot be utilized, either because providing enough transmission capacity for peak generation is not economically feasible, or because other sources of generated energy, such as hydro power, must be used instead.

Biomass is biologically produced matter. The chemical energy contained in biomass is derived from solar energy by the natural process of photosynthesis. This is the process by which plants take in carbon dioxide and water from their surroundings and, using energy from sunlight, convert them into carbohydrates. Biomass is, effectively, stored solar energy. However, biomass often decomposes easily and can be difficult to store for long periods of time.

Other energy sources and energy carriers, except fossil fuels, are not storable or are not storable for long periods of time. Nuclear fuels decay over time. Currently, the only practical means for storing electricity is batteries. However, batteries are expensive and inefficient, and only store electricity for a limited time.

Although fuels, biomass, and electricity are transportable, many forms of energy are not feasibly so. In addition, the energy required to transport and distribute energy carriers limits how far and fast they can be transported. Although electricity is transported quickly, transporting it is inefficient. For a form of energy to be practically transportable, it must have both sufficient specific energy, i.e. energy per unit mass, and energy density, i.e. energy per unit volume. Requirements for specific energy and energy density generally depend on the end use of the energy carrier.

Hydrogen ($H_2$) has been proposed as an alternative energy carrier. Unlike electricity, hydrogen can be stored. It can also be transported. Hydrogen releases energy when oxidized to form water. In fact, hydrogen has the greatest heat of combustion per mass (specific energy) of any combustible fuel. In addition, the only product of hydrogen oxidation with pure oxygen is water. Combustion in air may also generate some nitrogen oxides. Unfortunately, hydrogen is the least dense combustible fuel. Consequently, at standard temperature and pressure, its heat of combustion per volume is only a fraction of that for fossil fuels. In fact, the heat of combustion per volume for hydrogen is only about one-third of that for methane, the main component of natural gas. The low energy density of hydrogen precludes its practical use as transportation fuel and limits its use for distributing energy and even for stationary energy storage.

Most of the proposed carbon-neutral energy carriers are hydrocarbons. The synthesis of these compounds from carbon oxide requires hydrogen, which is usually provided by water. Since water is a limited resource in high demand for other uses, the need for water to produce these fuels is a significant drawback with adverse environmental impacts.

In principle, carbon can be produced from virtually any material containing carbon. Carbonaceous materials commonly include fossil resources such as natural gas, petroleum, coal, and lignite; and renewable resources such as lignocellulosic biomass and various carbon-rich waste materials. Solid and liquid feedstocks (whether fossil-based or renewable) can generally be converted to carbon-rich materials by pyrolysis and related processes.

In view of the above-mentioned shortcomings, there are many needs in the art. It is desired to improve upon prior methods of storing and dispatching energy, i.e. to provide a better energy carrier, especially for electrical power generation. It is desired to effectively store electrical energy for electrical load leveling, i.e. to match electrical generation with demand.

It is further desired to increase the utilization of renewable energy sources, especially for electrical power generation, by rendering renewable energy sources storable and dispatchable, thereby decreasing the need for conventional energy sources to meet fluctuating energy demand. Being dispatchable, the energy carrier produced from renewable energy can reduce the need for or even directly replace conventional energy sources.

Commercially, it is desired to decrease the cost of utilizing renewable energy sources, especially for electrical power generation, by decreasing the conventional energy generation capacity required to meet energy demand and/or increasing the utilization thereof. It would be desirable to store and dispatch energy, especially renewable energy, in a way that requires fewer changes to existing transportation and energy generation, transmission, and distribution infrastructure than alternative methods. It would be further desirable to store and dispatch energy, especially renewable energy, in a way that improves on the overall energy efficiency of alternative methods.

It is desired to facilitate distributed electrical power generation. It is further desired to store and dispatch energy in a way that is relatively safe. Additionally, it is desired to store and dispatch energy in a way that effectively recycles the materials used, thereby reducing or eliminating the generation of byproducts with negative environmental impacts, especially carbon dioxide and other greenhouse gases.

Furthermore, it is desired to provide a source of reliable, affordable energy for countries that lack adequate, economical conventional energy sources, but have wind and solar resources.

SUMMARY OF THE INVENTION

By effectively making renewable energy dispatchable, variations of this invention decrease the maximum coincident difference between demand and available renewable energy. In addition, embodiments of this invention increase the utilization of conventional generation capacity by decreasing the fluctuation in difference between demand and renewable supplies. Both of these improvements decrease the cost of conventional energy generation required to consistently meet energy demand, while still utilizing renewable energy sources. In certain embodiments, renewable energy sources can completely replace conventional energy sources while still meeting energy demand at all times. In addition, some embodiments of this invention increase the utilization of renewable energy sources by storing generation that would have been wasted for use at a different time, and perhaps place.

Some variations of the invention provide a process for transforming energy as available to energy on demand using the energy as available to reduce carbon oxide to carbon, separately oxidizing at least some of the carbon to generate the energy on demand and consequent carbon oxide, and recycling and/or reusing the consequent carbon oxide, either in actuality or virtually via the atmosphere.

In some embodiments, at least a portion of the carbon oxide is obtained, directly or indirectly, from the atmosphere. In these or other embodiments, at least a portion of the carbon oxide is obtained from an industrial process source.

The energy as available may be selected from the group consisting of fossil-fuel energy, wind energy, solar energy, biomass energy, moving-water energy, geothermal energy, nuclear energy, and combinations thereof. In preferred embodiments, the energy as available includes renewable energy, or consists entirely of renewable energy.

In some embodiments, the energy as available directly provides energy, heat, or work to reduce the carbon oxide to the carbon. In some embodiments, the energy as available is converted to secondary energy, and the secondary energy provides energy, heat, or work to reduce the carbon oxide to the carbon. The secondary energy is electricity, in certain embodiments.

The energy as available may directly or indirectly provide at least a portion of the carbon oxide to the process. For example, the energy as available may be biomass energy, which is generally associated with generation of carbon dioxide. In that case, the carbon dioxide may be used as, or combined with, the carbon oxide. Also the biomass energy may be associated with carbon monoxide, such as when biomass is gasified, in which case the carbon monoxide may be used as, or combined with, the carbon oxide.

The carbon oxide may be converted to a reduced stream comprising the carbon and an oxidant in a reduction reactor operated at effective reduction conditions. In some embodiments, the reduced stream consists essentially of carbon and an oxidant.

In various embodiments, the effective reduction conditions are provided by chemical, catalytic, thermal, electrical, dielectrical, ionic, plasma, electrochemical, electromagnetic, or photocatalytic means, or a combination thereof. In preferred embodiments, the effective reduction conditions are provided by electrons, photons, plasma, or combinations thereof. In some embodiments the extent of the reduction conditions may be varied or pulsed during the course of the reduction process.

The reduction reactor may be selected from the group consisting of a thermal reactor, a catalytic reactor, an electrolysis reactor, a reverse fuel cell, an electrochemical reactor, an electromagnetic reactor, a photocatalytic reactor, a pulsed laser reactor, and a plasma reactor, and combinations thereof.

In some embodiments, the carbon oxide comprises carbon monoxide, and the effective reduction conditions promote the carbon-forming Boudouard reaction.

Alternatively, or additionally, the carbon oxide may be reduced with a metal/metal oxide to generate the carbon and a further reduced metal oxide in a reduction reactor operated at effective reduction conditions. In these embodiments, the effective reduction conditions may be provided by chemical, catalytic, thermal, electrical, ionic, plasma, electrochemical, electromagnetic, or photocatalytic means, or a combination thereof.

In these embodiments, the reduction reactor may be selected from the group consisting of a thermal reactor, a catalytic reactor, an electrolysis reactor, a reverse fuel cell, an electrochemical reactor, an electromagnetic reactor, a photocatalytic reactor, a pulsed laser reactor, and a plasma reactor.

In any of these embodiments, the carbon oxide may be reduced to the carbon continuously, semi-continuously, or batchwise.

When the carbon oxide is converted to a stream(s) comprising carbon and an oxidant in a reduction reactor, the process optionally comprises separating the carbon from the oxidant in a separation unit that may be separate from, or integrated with, the reduction reactor.

In some embodiments, the carbon is amorphous carbon. In these or other embodiments, the carbon is densified (e.g., agglomerated, pelletized, or compressed) to increase its bulk density for more efficient handling.

In certain embodiments, the process further comprises supplementing the carbon with another carbon source, initially and/or continuously.

In some embodiments, the process further comprises transporting at least a portion of the carbon to an oxidation reactor. In certain embodiments, all of the carbon is transported to the oxidation reactor. The carbon may be transported by a transporting means selected from the group consisting of truck, train, ship, barge, pipeline, bulk solids conveyer, and combinations thereof.

In some particular embodiments, the carbon is transported by forming a slurry of carbon in liquid oxygen. The liquid oxygen may be derived from reduction of the carbon oxide to the carbon.

In some embodiments, the process further comprises intermediate storage of the carbon. The intermediate storage of the carbon may be located at a site associated with the energy as available, a site associated with the energy on demand, or both of these. Some other location may be used for intermediate storage of the carbon, if desired. The intermediate storage may be selected from the group consisting of piles, rail cars, truck trailers, tanks, silos, bins, hoppers, intermediate bulk containers, sacks, drums, and combinations thereof.

Some embodiments do not physically transport carbon to another location. For example, a common reactor may be utilized to reduce the carbon oxide to the carbon and then later to oxidize the carbon to the consequent carbon oxide.

In preferred embodiments, the carbon is oxidized with an oxidant. The carbon may be oxidized with oxygen, which may be obtained from air and/or from the reduction of the carbon oxide to carbon and oxygen. Alternatively, or additionally, the carbon may be oxidized with a metal oxide or another compound containing a metal and oxygen, such as a metal hydroxide.

Some embodiments further comprise transporting the oxidant from a reduction reactor to an oxidation reactor. Optionally, intermediate storage of the oxygen-containing compound is included, such as at a site associated with the energy as available, or at a site associated with the energy on demand, or both of these. Storage of the oxidant may be selected from the group consisting of a piles, rail cars, truck trailers, tanks, silos, bins, hoppers, intermediate bulk containers, sacks, drums, the atmosphere, and combinations thereof, for example.

In some embodiments, the intermediate storage of the oxidant is located at a storage site that is not co-located with sites associated with the energy as available or the energy on demand.

The oxidation of the carbon will typically (although not necessarily) be carried out in an oxidation reactor operated at effective oxidation conditions to generate reaction energy and an oxidized stream comprising the consequent carbon oxide. Exemplary oxidation reactors include, but are not limited to, a boiler, a conventional coal-fired power plant, a modified coal-fired power plant, a non-catalytic combustion unit, a catalytic oxidation reactor, a chemical-loop combustion system, a fuel cell, a combined heat and power system, and an integrated gasification combined cycle unit. In some embodiments, the oxidation reactor is a molten carbonate or solid oxide fuel cell.

Some or all of the carbon may be oxidized to generate the energy on demand and the consequent carbon oxide. The reaction energy may be directly recovered as the energy on demand. Alternatively, or additionally, the reaction energy may be converted to the energy on demand. The energy on demand may be selected from the group consisting of electrical energy, mechanical energy, thermal energy, chemical energy, electromagnetic energy, and combinations thereof. In preferred embodiments, the energy on demand is dispatchable and distributable renewable energy.

Preferably, at least 50% of the carbon oxide is provided by the recycling and/or reusing the consequent carbon oxide. More preferably, at least 90% of the carbon oxide is provided by the recycling and/or reusing the consequent carbon oxide. Most preferably, all of the carbon oxide is provided by the recycling and/or reusing the consequent carbon oxide. In addition, in certain embodiments, essentially all (except for process losses) of the consequent carbon oxide is recycled and/or reused. Any of these recycling and/or reusing scenarios may be achieved in actuality or virtually.

The consequent carbon oxide may be recycled and/or reused in actuality. Alternatively, or additionally, the consequent carbon oxide, as carbon dioxide, may be recycled and/or reused virtually via the atmosphere. Any combination or ratio of carbon oxide recycled or reused actually, versus that recycled or reused virtually, may be employed.

In some embodiments, the process further comprises intermediate storage of the consequent carbon oxide. The intermediate storage of the consequent carbon oxide may be located at a site associated with the energy on demand and/or at a site associated with the energy as available. In some embodiments, the intermediate storage of the consequent carbon oxide is located at a carbon oxide storage site that is not co-located with sites associated with the energy as available or the energy on demand. For example, the carbon oxide storage may be selected from the group consisting of rail cars, truck trailers, tanks, silos, bins, hoppers, intermediate bulk containers, sacks, drums, the atmosphere, and combinations thereof.

The energy as available sub-system may be co-located with the energy on demand sub-system at a single plant site. Or, the energy as available sub-system and the energy on demand sub-system may be located at separate sites.

In preferred embodiments of the invention, the process generates essentially no net carbon emissions (as carbon itself or as carbon oxide). Again, the attainment of no net carbon may be achieved in actuality or virtually.

Some embodiments provide a process for transforming renewable wind or solar energy as available to dispatchable energy on demand, the process comprising:
(a) using the renewable wind or solar energy as available, in thermal, electron, photon, or plasma form, to reduce carbon oxide to carbon and oxygen;
(b) increasing bulk density of the carbon;
(c) separately oxidizing at least some of the carbon to generate the energy on demand and consequent carbon oxide; and
(d) recycling and/or reusing the consequent carbon oxide, either in actuality or virtually via the atmosphere,
wherein the process is characterized by essentially zero net carbon emissions.

The present invention also provides systems and apparatus for carrying out the processes disclosed. Some embodiments provide a system that transforms energy as available to energy on demand, the system comprising a first sub-system to use the energy as available to reduce carbon oxide to carbon, a second sub-system to separately oxidize at least some of the carbon to generate the energy on demand and consequent carbon oxide, and means for recycling and/or reusing the consequent carbon oxide, either in actuality or virtually via the atmosphere.

DETAILED DESCRIPTION OF EMBODIMENTS OF THE INVENTION

Figure 1:
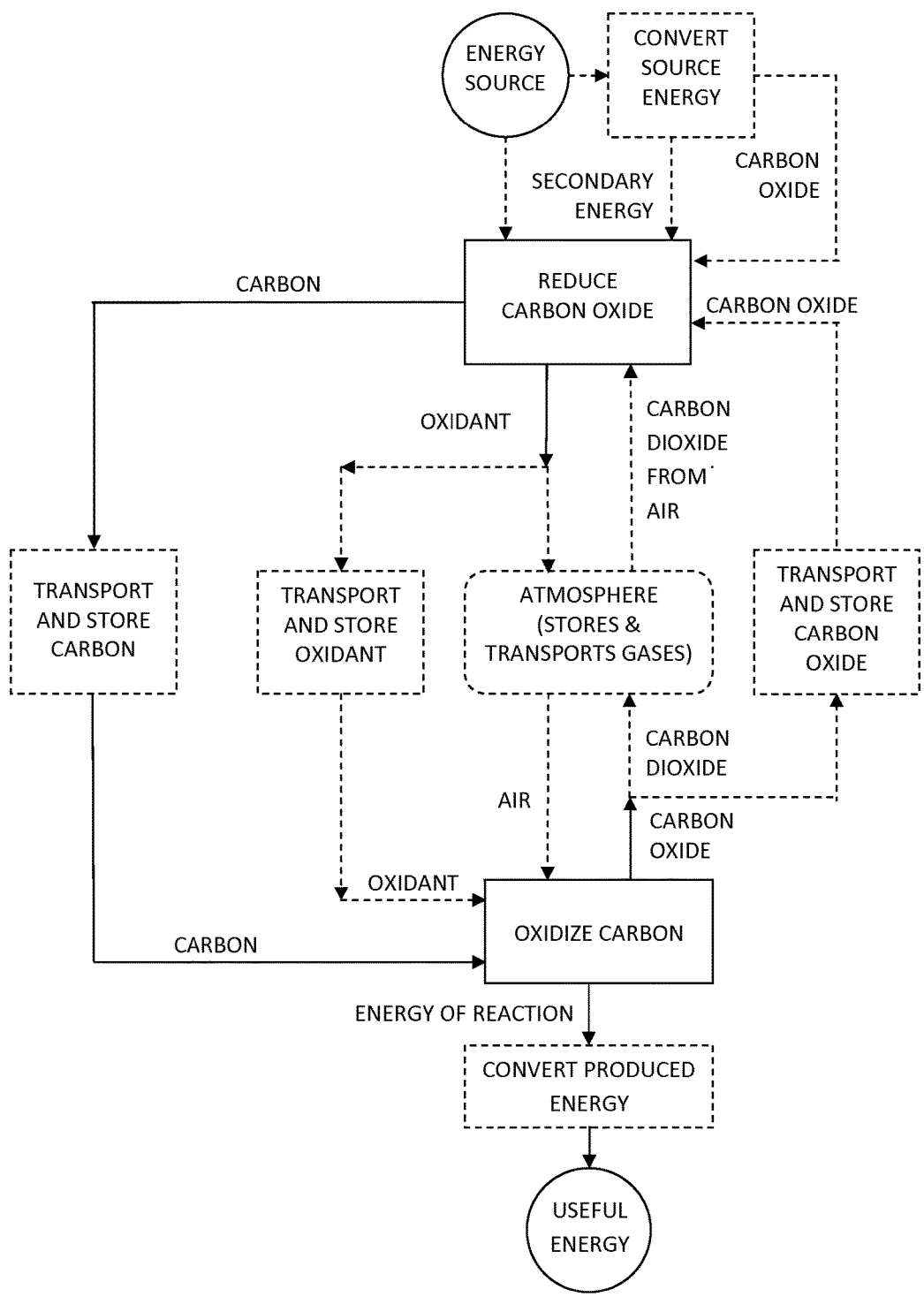
FIG. 1 is a process block-flow diagram depicting various embodiments of the invention, to reduce carbon oxide and separately oxidize carbon to produce useful energy.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

For purposes of this patent application, "carbon oxide" means carbon monoxide (CO), carbon dioxide ($CO_2$), or any combination of carbon monoxide and carbon dioxide. In embodiments of the invention involving transport of carbon oxide or release of carbon oxide to the atmosphere, carbon oxide will typically be carbon dioxide. Carbon oxide may be a gas, liquid, or solid, depending on the process step and the embodiment of the invention, but carbon oxide is preferably a gas.

"Carbon" means elemental carbon in any form, recognizing that impurities may be present in the carbon physically and/or chemically. Carbon may include a mixture of allotropes, possibly in combination with other materials. Carbon is preferably dense, free-flowing, particulates of amorphous carbon.

As intended in this patent, an "oxidant" means any form of the element oxygen, which may be combined with another element or compound, and which may be present in a mixture of other species. For example, without limitation, an oxidant may be oxygen as defined in this patent, an oxide, or a metal oxide. The oxidant may be a gas, liquid or solid, depending on the process step and the embodiment of the invention. When the oxidant is oxygen, it may be utilized as a component of air.

"Oxygen" is any form of the element oxygen, preferably diatomic molecular form ($O_2$), optionally ozone ($O_3$), ionized oxygen or oxygen radicals. Oxygen may be a gas, liquid or solid, depending on the process step and the embodiment of the invention, but is preferably a gas. If oxygen is stored and transported, it is preferably a liquid. Oxygen may be utilized as a component of air, which is the gaseous mixture that comprises the atmosphere, primarily nitrogen and oxygen, with smaller concentrations of water, carbon dioxide, and other gases.

An "energy source" may be any form of energy, generally a primary energy source or electricity. An energy source is preferably a renewable energy source, but may be any other form of energy including fossil-fuel energy, nuclear energy, and so on.

A "primary energy source" is energy found in nature that has not been subjected to any conversion or transformation process, including unprocessed fossil and nuclear fuels, biomass, wind, solar, moving water and geothermal energy.

"Secondary energy" is an optional form of energy generated from the energy source. Secondary energy is generally thermal, electrical or mechanical energy, but may be other forms of energy.

"Useful energy" is the final desired form of energy, generally, but not limited to, electricity, heat or mechanical energy, depending on the final use for the energy. Useful energy produced by the invention may require or benefit from further steps, such as transmission and/or distribution to be delivered for use. Alternatively or additionally, useful energy may be used to perform work directly.

"Energy as available" means an energy source, typically a primary energy source, that may be utilized directly or indirectly to carry out carbon oxide reduction. An "energy as available sub-system" means a sub-system, in an overall system, that includes energy as available and means for reducing carbon oxide to carbon (see, for example, upper box of FIG. 2). Note that the location of energy as available may be the same or different than the location of the carbon oxide reduction.

"Energy on demand" means useful energy that is recovered, directly or indirectly, from reaction energy derived from carbon oxidation. An "energy on demand sub-system" means a sub-system, in an overall system, that includes energy on demand and means for capturing reaction energy from carbon oxidation (see, for example, lower box of FIG. 2). Note that the location of energy on demand may be the same or different than the location of the carbon oxidation.

When the carbon oxide, carbon and/or oxidant are transported, the "theoretical effective specific energy" is the theoretical usable energy per mass based on the exothermic heat of reaction of the "oxidize carbon" step and the total mass of transported reactants (or inputs) and products (or outputs). Likewise, "theoretical effective energy density" is the theoretical usable energy per volume based on the exothermic heat of reaction of the "oxidize carbon" step and the total volume of transported reactants (or inputs) and products (or outputs).

Some variations of the invention are premised on the realization that energy as available may be effectively transformed to energy on demand, by reusing and/or recycling carbon in overall processes and systems described herein. In particular, carbon may first be generated from carbon oxide, followed by oxidizing that carbon with an oxidant (such as oxygen) to generate useful energy on demand, and recycling the consequent (from carbon oxidation) carbon oxide, either in actuality or virtually via the atmosphere. It has been discovered that such processes may be configured to generate essentially no net carbon dioxide or air pollutants. In some embodiments, the carbon, the oxidant, and carbon oxide are all reused and/or recycled materials within the process.

Most proposed energy carriers are either liquid or gaseous fuels. This makes sense because fluids are generally easier to store, handle, and transport than solids. However, the least expensive fuel to transport must have both high specific energy and high energy density. Although the specific energy of combustion of carbon (32.8 MJ/kg) is less than that of hydrogen (142 MJ/kg), methane (55.5 MJ/kg), and octane (47.9 MJ/kg), it is double that of biomass (15.6 MJ/kg as glucose); and the energy density of combustion of carbon (55.7 GJ/m$^3$, based on solid amorphous carbon) is greater than that of hydrogen (0.0128 GJ/m$^3$), methane (0.0398 GJ/m$^3$), octane (33.7 GJ/m$^3$), and biomass (24.0 GJ/m$^3$ as glucose). Since the specific energy and energy density of carbon are both comparable to octane, which is a surrogate for gasoline, carbon is a good candidate for an energy carrier.

Generally speaking, producing carbon requires a carbon-containing feedstock and energy to extract carbon from that feedstock. The carbon-containing feedstock could be fossil fuels (e.g., hydrocarbons or coal), biomass, carbonates in rocks, carbon monoxide, or carbon dioxide. Carbon dioxide exists naturally in water and air. High concentrations of carbon dioxide are typically present in combustion products from burning fossil fuels, especially from burning coal.

"Biomass," for purposes of this disclosure, shall be construed as any biogenic feedstock or mixture of a biogenic and non-biogenic feedstock. Elementally, biomass includes at least carbon, hydrogen, and oxygen. Biomass includes, for example, plant and plant-derived material, vegetation, agricultural waste, forestry waste, wood waste, paper waste, animal-derived waste, poultry-derived waste, and municipal solid waste. In various embodiments of the invention utilizing biomass, the biomass feedstock may include one or more materials selected from: timber harvesting residues, softwood chips, hardwood chips, tree branches, tree stumps, knots, leaves, bark, sawdust, off-spec paper pulp, green or black liquor from paper pulping, cellulose, corn, corn stover, wheat straw, rice straw, sugarcane bagasse, switchgrass, miscanthus, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth.

Various embodiments of the present disclosure may also be used for carbon-containing feedstocks other than biomass, such as a fossil fuel (e.g., coal or petroleum coke), or any mixtures of biomass and fossil fuels (such as biomass/coal blends). In some embodiments, a biogenic feedstock is, or includes, coal, oil shale, crude oil, asphalt, or solids from crude-oil processing (such as petcoke). Feedstocks may include waste tires, recycled plastics, recycled paper, and other waste or recycled materials. Any process, apparatus, or system described herein may be used with any carbonaceous feedstock. Carbon-containing feedstocks may be transportable by any known means, such as by truck, train, ship, barge, tractor trailer, or any other vehicle or means of conveyance.

Variations of the invention utilize and recycle carbon, oxygen, and carbon oxide as materials to store and transfer energy from renewable energy sites to sites of energy generation and use on demand, thereby providing a sustainable, carbon-neutral energy storage and transfer system. This sustainable chemical energy conversion and storage system can minimize the costs to transport and distribute renewable energy.

At or near a renewable energy source, generated energy may be used to produce carbon from carbon oxide according to the chemical equation (in embodiments producing molecular oxygen):

$$CO_x + energy \rightarrow C + 0.5xO_2$$

This reaction is an endothermic reduction of carbon oxide to carbon and oxygen. The reduction step will be further discussed below, including alternative embodiments.

The carbon may be collected, stored, and transported to energy generation sites or points of use. The oxygen may be transported to energy generation sites and points of use for oxidation of the carbon. Optionally, the oxygen may be exhausted to atmosphere, and/or collected for other uses.

At the energy generation sites or points of use, the carbon is oxidized with an oxidant, such as air or oxygen, to produce carbon oxide, according to the equation (when the oxidant is oxygen or air):

$$C+0.5xO_2 \rightarrow CO_x + \text{energy}$$

This reaction is exothermic oxidation of carbon to produce carbon oxide. The oxidation step will be further discussed below, including alternative embodiments. The energy of reaction is the heat of combustion, i.e. the energy released from the oxidation of carbon. The energy of reaction could take one of several different forms depending on the means used to perform the oxidation. If the means of oxidation is combustion, the energy of reaction is heat. If the means of oxidation is electrochemical, at least some of the energy of reaction is electricity.

The carbon oxide is either collected and transported back to the renewable energy generation site or, as CO2, is exhausted to atmosphere. If the carbon oxide is exhausted to atmosphere, the renewable energy sites may utilize carbon dioxide from air or combustion of biomass in order for the overall system to be sustainable with no net generation of carbon dioxide into the atmosphere. Such a virtual system is described in more detail below.

By effectively making renewable energy dispatchable, variations of this invention decrease the maximum coincident difference between demand and available renewable energy. In addition, embodiments of this invention increase the utilization of conventional generation capacity by decreasing the fluctuation in difference between demand and renewable supplies. Both of these improvements decrease the cost of conventional energy generation required to consistently meet energy demand, while still utilizing renewable energy sources. In certain embodiments, renewable energy sources can completely replace conventional energy sources while still meeting energy demand at all times. In addition, some embodiments of this invention increase the utilization of renewable energy sources by storing generation that would have been wasted for use at a different time, and perhaps place.

Some variations of the invention provide a process for transforming energy as available to energy on demand using the energy as available to reduce carbon oxide to carbon, separately oxidizing at least some of the carbon to generate the energy on demand and consequent carbon oxide, and recycling and/or reusing the consequent carbon oxide, either in actuality or virtually via the atmosphere.

In some embodiments, at least a portion of the carbon oxide is obtained, directly or indirectly, from the atmosphere (typically as $CO_2$). Carbon dioxide may be recovered directly from the atmosphere by separation means, such as cryogenic distillation, scrubbing, membrane filtration, zeolite separation, moisture-swing absorption, and so on. Carbon dioxide may be recovered directly from the atmosphere by scrubbing with calcium oxide or sodium hydroxide, for example. Carbon dioxide may be recovered directly from the atmosphere by reacting directly with a metal/metal oxide to form a metal oxide and carbon. Carbon dioxide may be recovered indirectly from the atmosphere by various means, including as renewable biomass with accounting of net $CO_2$, as will be described in more detail below.

Eisaman, et al., "Carbon-neutral liquid fuel from sunlight, air, and water," Gordon Research Conference on Renewable Energy: Solar Fuels, 2009, is hereby incorporated by reference herein. Eisaman discloses electrochemical methods for separating $CO_2$ from air for the purpose of producing carbon-neutral liquid fuel using only sunlight, air, and water. Using a modified-fuel-cell approach, the authors have demonstrated $CO_2$ separation from atmospheric concentrations with an energy consumption of less than 400 kJ/mol ($CO_2$).

In these or other embodiments, at least a portion of the carbon oxide is obtained from an industrial process source (which may be CO or $CO_2$). There are many industrial process sources of CO or $CO_2$, such as power plants, refineries, biorefineries, food plants, pulp and paper plants, fermentation processes, metal processes, and so on.

The energy as available may be selected from the group consisting of fossil-fuel energy, wind energy, solar energy, biomass energy, moving-water energy, geothermal energy, nuclear energy, and combinations thereof. In preferred embodiments, the energy as available includes renewable energy, or consists entirely of renewable energy.

In some embodiments, the energy as available directly provides energy, heat, or work to reduce the carbon oxide to the carbon. In some embodiments, the energy as available is converted to secondary energy, and the secondary energy provides energy, heat, or work to reduce the carbon oxide to the carbon. The secondary energy may be electricity, in certain embodiments, such as when the energy as available is solar or wind power.

The energy as available may directly or indirectly provide at least a portion of the carbon oxide to the process. For example, the energy as available may be biomass energy that is associated with generation of carbon oxide, either carbon dioxide (when fully oxidized) or carbon monoxide (when partially oxidized, e.g. during gasification). Such carbon oxide may be used as the starting source of carbon oxide, or it may be combined with other carbon oxide.

The carbon oxide may be converted to (a) reduced stream(s) comprising the carbon and oxygen in a reduction reactor operated at effective reduction conditions. In some embodiments, the reduced stream(s) consists essentially of carbon and oxygen.

In various embodiments, the effective reduction conditions are provided by chemical, catalytic, thermal, electrical, ionic, plasma, electrochemical, electromagnetic, or photocatalytic means, or a combination thereof. In preferred embodiments, the effective reduction conditions are provided by electrons, photons, plasma, or combinations thereof.

The reduction reactor may be selected from the group consisting of a thermal reactor, a catalytic reactor, an electrolysis reactor, a reverse fuel cell, an electrochemical reactor, an electromagnetic reactor, a photocatalytic reactor, a pulsed laser reactor, and a plasma reactor, and combinations thereof.

In some embodiments, the carbon oxide comprises carbon monoxide, and the effective reduction conditions promote the carbon-forming Boudouard reaction:

$$2CO \rightarrow C + CO_2$$

The $CO_2$ produced may then be reduced to carbon and oxygen (or another oxygen-containing material). The Boudouard reaction is promoted by high pressures and relatively low temperatures (compared to temperatures for carbon oxide reduction). In some embodiments, the Boudouard reaction is only important in certain regions of a reactor or other unit, in which for example there are localized cool spots.

Alternatively, or additionally, the carbon oxide may be reduced with a metal/metal oxide to generate the carbon and a metal oxide in a reduction reactor operated at effective reduction conditions. In these embodiments, the effective reduction conditions may be provided by chemical, catalytic, thermal, electrical, ionic, plasma, electrochemical, electromagnetic, or photocatalytic means, or a combination thereof.

In these embodiments, the reduction reactor may be selected from the group consisting of a thermal reactor, a catalytic reactor, an electrolysis reactor, a reverse fuel cell, an electrochemical reactor, an electromagnetic reactor, a photocatalytic reactor, a pulsed laser reactor, and a plasma reactor.

An exemplary pulsed laser reactor is disclosed in Fukuda, et al., *New Journal of Physics* 9 (2007) 321, which is hereby incorporated by reference herein. Fukuda discloses a reactor for dissociating $CO_2$ to C and $O_2$ at near critical conditions, 31° C. and 7.38 MPa. Operating near room temperature, the reactor uses a pulsed UV laser coupled with an electric field to produce carbon on the electrodes.

An exemplary plasma reactor is disclosed in DE102009048541 to Hosbach, et al., which is hereby incorporated by reference herein. Hosbach discloses a plasma reactor that uses electrodes with an intermittent, pulsed electrical potential to dissociate $CO_2$ into C and $O_2$.

In any of these embodiments, the carbon oxide may be reduced to the carbon continuously, semi-continuously, or batchwise. That is, the energy as available sub-system may be operated continuously, semi-continuously, or batchwise. Also, the energy on demand sub-system may be operated continuously, semi-continuously, or batchwise. The mode of operation of the energy as available sub-system is independent from that of the energy on demand sub-system. For example, the energy as available sub-system could operate semi-continuously while the energy on demand sub-system operates continuously. Or each sub-system could operate essentially in batchwise mode, with the overall system operating semi-continuously or pseudo-continuously. It should be also noted that some embodiments employ sequential batches in the same reactor or vessel, i.e., carbon oxide reduction to carbon and then later carbon oxidation, without necessarily removing the carbon and without necessarily moving the reactor or vessel.

When the carbon oxide is converted to a reduced stream comprising carbon and oxygen in a reduction reactor, the process optionally comprises separating the carbon from the oxygen in a separation unit that may be separate from, or integrated with, the reduction reactor. When the carbon oxide is reduced with a metal/metal oxide to generate the carbon and a metal oxide in a reduction reactor, the process optionally comprises separating the carbon from the metal oxide in a separation unit that may be separate from, or integrated with, the reduction reactor.

For example, see WO 2011/050437 (Cundliffe), which is incorporated by reference herein. Cundliffe discloses a thermo-electric-dielectric reactor for reducing carbon oxide to C and $O_2$ at industrial scale. The reactor has a working zone where CO or $CO_2$ is dissociated to ionic C and O by simultaneous heating and subjection to an electric field. The ionic O is separated, ultimately forming $O_2$. The reactor also has a transition zone and a carbon collection zone where carbon is condensed from the gaseous stream. Reactor pressure ranges from 0.07-9.65 MPa. Working zone conditions are 1,000-2,400° C. and 10-150 amps. The carbon collection zone temperature is at least 700° C. less than the working zone, approximately 300-800°, most preferably 0-300° C.

In some embodiments, the carbon is amorphous carbon. In these or other embodiments, the carbon is densified (e.g., agglomerated, pelletized, or compressed) to increase its bulk density for more efficient handling. Other allotropes of carbon may be present, such as graphite, graphene, carbon nanostructures, etc. Other components may be present with the carbon, such as solid impurities from processes (e.g., ash), or other elements (e.g., hydrogen, nitrogen, sulfur, etc.).

The composition of the carbon will typically be primarily C itself, but generally speaking the carbon will comprise at least 85 wt %, at least 90 wt %, at least 95 wt %, at least 96 wt %, at least 97 wt %, at least 98 wt %, or at least 99 wt % carbon.

In certain embodiments, the process further comprises supplementing the carbon with another carbon source, initially and/or continuously. This other carbon source may be introduced to the carbon derived from the carbon reduction step, prior to the carbon oxidation step. The other carbon source may be pure carbon, char, biochar, charcoal, coal, biomass, or any other carbonaceous material.

In some embodiments, the process further comprises transporting at least a portion of the carbon to an oxidation reactor. In certain embodiments, all of the carbon is transported to the oxidation reactor. The carbon may be transported by a transporting means selected from the group consisting of truck, train, ship, barge, pipeline, bulk solids conveyer, and combinations thereof. A bulk solids conveyer may be any known material handling system, such as belt, screw or pneumatic conveying systems, for example.

In some particular embodiments, the carbon is transported by forming a slurry of carbon in liquid oxygen. The liquid oxygen may be derived from reduction of the carbon oxide to the carbon. Because the slurry is at a low temperature, the combustion potential should be low. In these embodiments, the carbon-oxygen slurry may be fed to an oxidation reactor, to generate energy and carbon oxide.

In some embodiments, the process further comprises intermediate storage of the carbon. The intermediate storage of the carbon may be located at a site associated with the energy as available, a site associated with the energy on demand, or both of these. In some embodiments, the energy as available sub-system is co-located with the energy on demand sub-system, in which case the carbon intermediate storage may be at such single site. Any other location may be used for intermediate storage of the carbon, if desired.

In some embodiments, the intermediate storage of the carbon may use piles, rail cars, truck trailers, tanks, silos, bins, hoppers, intermediate bulk containers, sacks, drums and/or combinations thereof.

Some embodiments do not physically transport carbon to another location. For example, a common reactor may be utilized to reduce the carbon oxide to the carbon and then later to oxidize the carbon (or a portion thereof) to carbon oxide.

In preferred embodiments, the carbon is oxidized with an oxygen-containing compound as oxidant. The carbon may be oxidized with oxygen, which may be obtained from air and/or from the reduction of the carbon oxide to carbon and oxygen. Alternatively, or additionally, the carbon may be oxidized with a metal oxide or another oxygen-containing metal species.

Some embodiments further comprise transporting the oxidant from a reduction reactor to an oxidation reactor. Optionally, intermediate storage of the oxidant is included, such as at a site associated with the energy as available, or at a site associated with the energy on demand, or both of these.

In some embodiments, the intermediate storage of the oxidant is located at a storage site that is not co-located with sites associated with the energy as available or the energy on demand. For example, storage sites for the oxidant may be selected from the group consisting of an offsite storage vessel, a pipeline, a gas distribution network (when the oxidant is a gas), the atmosphere (when the oxidant is $O_2$ or air), and combinations thereof.

In some embodiments, the intermediate storage of the oxidant may use piles, rail cars, truck trailers, tanks, silos, bins, hoppers, intermediate bulk containers, sacks, drums and/or combinations thereof.

The oxidation of the carbon will typically (although not necessarily) be carried out in an oxidation reactor operated at effective oxidation conditions to generate reaction energy and an oxidized stream comprising the consequent carbon oxide. Exemplary oxidation reactors include, but are not limited to, a boiler, a conventional coal-fired power plant, a modified coal-fired power plant, a non-catalytic combustion unit, a catalytic oxidation reactor, a chemical-looping combustion unit, a fuel cell, and an integrated gasification combined cycle unit. In some embodiments, the oxidation reactor is a molten carbonate fuel cell or solid oxide fuel cell.

CN201865710U to Wu, et al., which is hereby incorporated by reference herein, discloses a chemical-looping combustion system using a Ni catalyst that consumes coal and air, producing energy, essentially pure $CO_2$, $H_2O$, $N_2$, and slag. Coal is gasified into CO and $CH_4$, which is fed into the first vessel where Ni is reduced. The nickel is oxidized in a second vessel with air, to form nickel oxide. In embodiments of this invention, a feed of pure carbon could be gasified with $CO_2$ to generate CO as feed to a Ni reduction vessel, in which case the system would not generate $H_2O$.

Some or all of the carbon may be oxidized to generate the energy on demand and the consequent carbon oxide. The reaction energy may be directly recovered as the energy on demand. Alternatively, or additionally, the reaction energy may be converted to the energy on demand. The energy on demand may be selected from the group consisting of electrical energy, mechanical energy, thermal energy, chemical energy, electromagnetic energy, and combinations thereof. In preferred embodiments, the energy on demand is dispatchable and distributable renewable energy.

Preferably, at least 50%, 55%, 60%, 65%, 70%, 75%, 80%, or 85% of the carbon oxide is provided by recycling and/or reusing the consequent carbon oxide. More preferably, at least 90%, 91%, 92%, 93%, 94%, 95%, 96%, 97%, 98%, or 99% of the carbon oxide is provided by recycling and/or reusing the consequent carbon oxide. Most preferably, all (or essentially all) of the carbon oxide is provided by the recycling and/or reusing the consequent carbon oxide. Any of these embodiments may be achieved in actuality or virtually.

In addition, in certain embodiments, essentially all (except for process losses) of the consequent carbon oxide is recycled and/or reused. Note that these embodiments are not necessarily the same as embodiments in which all of the carbon oxide is provided by the recycling and/or reusing of the consequent carbon oxide; in the former, consequent $CO_x$ from oxidation is all recycled and/or reused, while in the latter, some fraction of consequent $CO_x$ might not be recycled but all of the carbon oxide for reduction is derived from recycle and/or reuse. Many scenarios are possible due to transient versus steady-state operations, process losses and make-up streams, and recycling and/or reusing in actuality or virtually.

The consequent carbon oxide may be recycled and/or reused in actuality. Alternatively, or additionally, the consequent carbon oxide may be recycled and/or reused virtually via the atmosphere. Any combination or ratio of carbon oxide recycled or reused actually, versus that recycled or reused virtually, may be employed. For example, the percentage of carbon oxide recycled or reused in actuality may be zero, or about 5%, 10%, 15%, 20%, 25%, 30%, 40%, 50%, 60%, 70%, 80%, 90%, or 100%.

In some embodiments, the process further comprises intermediate storage of the consequent carbon oxide. The intermediate storage of the consequent carbon oxide may be located at a site associated with the energy on demand and/or at a site associated with the energy as available. In some embodiments, the intermediate storage of the consequent carbon oxide is located at a carbon oxide storage site that is not co-located with sites associated with the energy as available or the energy on demand. For example, the carbon oxide storage site may be selected from the group consisting of an offsite storage vessel, a pipeline, a gas distribution network, an underground geological formation, a body of water, the atmosphere, and combinations thereof.

In some embodiments, the intermediate storage of the carbon oxide may use rail cars, truck trailers, tanks, silos, bins, hoppers, intermediate bulk containers, sacks, drums and/or combinations thereof.

The energy as available sub-system may be co-located with the energy on demand sub-system at a single plant site. Or, the energy as available sub-system and the energy on demand sub-system may be located at separate sites.

In preferred embodiments of the invention, the process generates essentially no net carbon emissions (as carbon oxide). Again, the attainment of no net carbon may be achieved in actuality or virtually.

Variations of this invention involve a number of process steps, many of which are optional. The steps may involve multiple sub-steps. It should be noted that the steps may involve additional input and output streams not shown or described.

Referring now generally to FIGS. 1-5, block flow diagrams of exemplary embodiments of the present disclosure are illustrated. It should be appreciated that these figures represent some example embodiments but not all contemplated embodiments of the present disclosure. As discussed below, various additional non-illustrated embodiments and combinations of the several components and features discussed herein are also contemplated.

FIGS. 1-5 present process block flow diagrams of some embodiments of the invention. The diagrams use circles for inputs and outputs, rectangles for process steps, lines with arrows to show the flow of material and energy, and rounded rectangles for material sources and sinks Items that are optional are denoted with dashed lines. Alternating dot-dashed lines encompass items preferably in the vicinity of each other, in sub-systems denoted as "energy as available" and "energy on demand" (in FIG. 2).

In FIG. 1, the energy source may be any form of energy, generally a primary energy source. The energy source is preferably a renewable energy source. "Secondary energy" is an optional form of energy generated from the energy source. Secondary energy is generally thermal or electrical energy, but may be other forms of energy.

The "convert source energy" step converts an energy source into secondary energy and, optionally, generates carbon oxide. The preferred form of secondary energy is generally electricity, although heat may be desirable when the energy source is solar or geothermal energy.

The "reduce carbon oxide" step of FIG. 1 uses the energy source and/or secondary energy to chemically reduce carbon oxide to carbon and oxygen. Carbon oxide may be either carbon monoxide, carbon dioxide, or a mixture of both. Carbon oxide may be carbon dioxide extracted from air, flue gases, or other sources.

The carbon oxide reduction, as discussed above, may be accomplished by various means known in the art. The carbon oxide reduction may involve electrons, negative ions, plasma, photons, or metal/metal oxides, for example. In some embodiments, the carbon oxide reduction does not involve hydrogen ($H_2$) or hydrogen-containing compounds, including water.

The overall chemical reaction for this step, summarizing the result of chemical reactions of all sub-steps within this step, is:

$$CO_x + \text{energy} \rightarrow C + 0.5xO_2$$

This step also may include the sub-step of separating carbon and oxygen (or another oxidant) and may include other upstream and downstream process steps as required by the particular embodiment of the invention.

In particular, sub-steps of this step may include water as a reactant and/or product, such as according to the equations:

$$nH_2O \rightarrow nH_2 + (0.5n)O_2$$

$$CO_x + nH_2 \rightarrow C + nH_2O$$

The net result of these reactions is the reduction of carbon oxide to carbon and oxygen. In general, this invention shall not be limited by any particular reaction mechanisms that take place to achieve the overall chemistry.

U.S. Pat. No. 3,861,885 to Schora, which is incorporated by reference herein, describes a process for producing nonpolluting carbon black fuel from polluting carbonaceous fossil fuels. The carbon deposition step of the Schora process involves producing carbon black from a carbon monoxide rich gas stream generated by gasification of fossil fuel. In some embodiments, the present invention uses the carbon deposition step of Schora as part of the carbon oxide reduction step.

In other embodiments of the present invention that use carbon dioxide, rather than carbon monoxide, as the input to the "reduce carbon oxide" step, carbon dioxide is first converted to carbon monoxide either using hydrogen produced from the electrolysis of water via equation to effect the water-gas shift reaction, $$CO_2 + H_2 \rightarrow CO + H_2O$$

and/or using some recycled carbon according to the reverse Boudouard reaction:

$$C + CO_2 \rightarrow 2CO$$

U.S. Pat. No. 6,270,731 to Kato, et al., which is incorporated by reference herein, discloses a carbon fixation reactor operating according to the equation:

$$CO_2 + 2H_2 \rightarrow C + 2H_2O$$

Hydrogen for this process could be produced by cleaving water with energy as available or secondary energy, such as by electrolysis:

$$2H_2O \rightarrow 2H_2 + O_2$$

U.S. Patent Application Publication Nos. 20090013593A1 and 20090016948A1, both to Young and each incorporated by reference herein, teach methods for reducing carbon dioxide produced from carbonaceous fuel using various combinations of magnesium, magnesium oxides, and magnesium salts. In these applications of Young, $CO_2$ is introduced onto an electrode with an applied voltage to form Mg from MgO. The Mg reacts with $CO_2$ to form CO and carbon, and MgO. The reaction is driven to completion by a constant gas pressure, and the carbon layer can be harvested. The carbon may be washed to recover residual oxide and salts. In some embodiments of the present invention, the methods of Young are used as part of the "reduce carbon oxide" step.

The "oxidize carbon" step in FIG. 1 chemically oxidizes carbon using oxidant producing carbon oxide and energy of reaction. The oxidant may be provided by air, pure oxygen, oxygen-enriched air or metal oxide. The block for this step includes the overall chemical reaction, summarizing the result of chemical reactions of all sub-steps in this step, is $$C + 0.5xO_2 \rightarrow CO_x + \text{energy}$$

Oxidizing carbon may be done by combustion, generating heat; or in a fuel cell, generating primarily electricity. It may include the sub-step of separating carbon oxide from the reactants and may include other upstream and downstream process steps as required by the particular embodiment of the invention.

In FIG. 1, the "atmosphere" is the blanket of air covering the earth. It is a source and sink for atmospheric gases, namely oxygen and carbon dioxide, pertinent to some embodiments of the invention. Because the atmosphere is in nearly constant motion and its constituents can be extracted from or exhausted to it anywhere on earth, the atmosphere may function as a virtual storage and transport system for oxygen and carbon dioxide.

Figure 2:
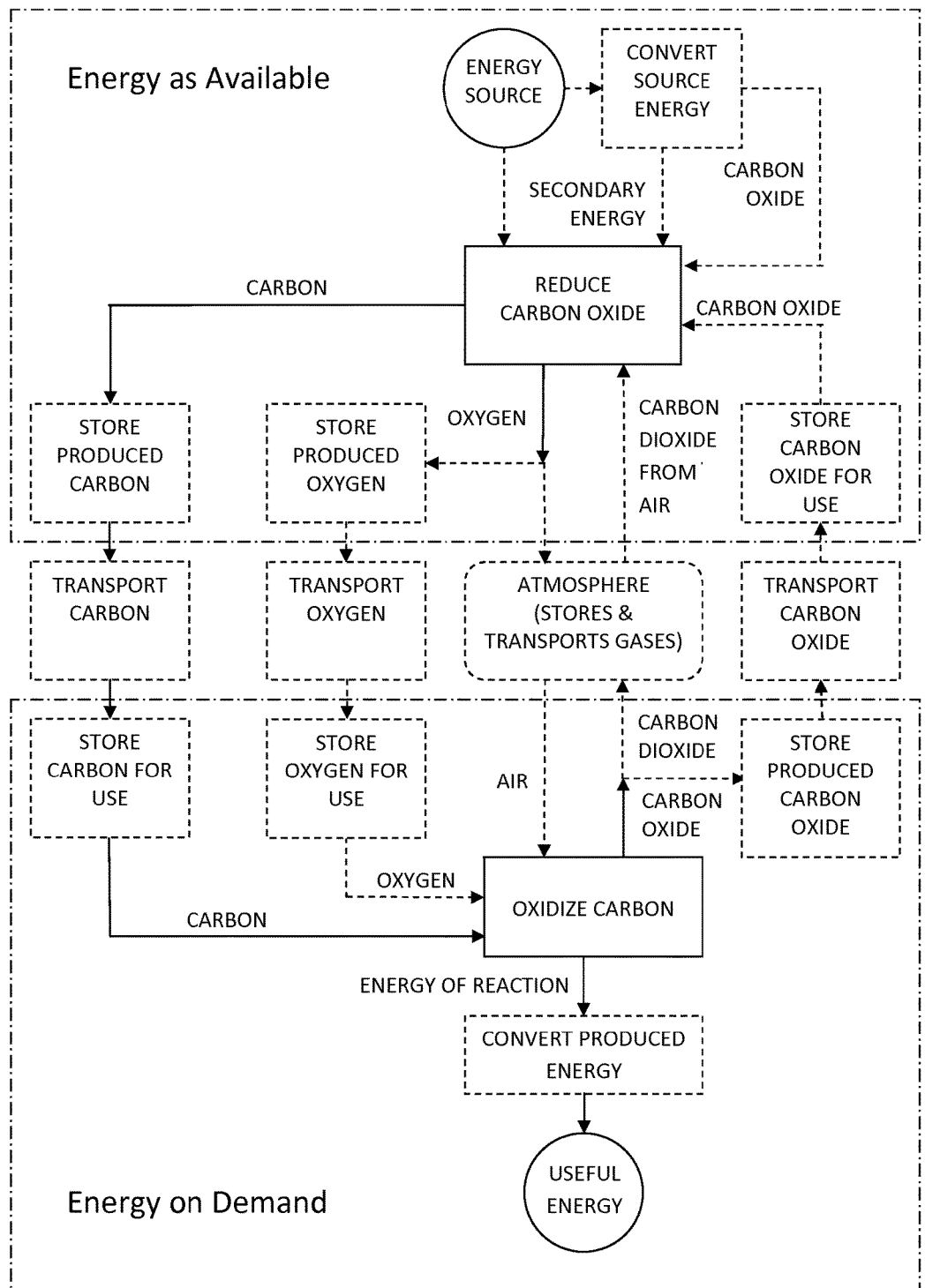
FIG. 2 is a process block-flow diagram depicting some embodiments of the invention, to transform energy as available to energy on demand.

The block flow diagram of FIG. 2 designates two sub-systems, "energy as available" and "energy on demand." "Energy as available" is the location of the energy source and the carbon oxide reduction step, which produces carbon. "Energy on demand" is the location of the carbon oxidation step and the "convert produced energy" step, required for some embodiments of the invention, to generate useful energy. Although the two locations could be co-located, they may be distant from each other and are potentially hundreds or even thousands of miles apart.

The "store produced carbon oxide" step involves storing carbon oxide produced from the "oxidize carbon" step. The "transport carbon oxide" step involves transporting carbon oxide from the vicinity of the "energy on demand" sub-system to the vicinity of the "energy as available" sub-system. The "store carbon oxide for use step" involves storing carbon oxide for future use in the vicinity of the "energy as available" sub-system. All of these steps are optional.

The "store produced carbon" step involves storing carbon produced from the "reduce carbon oxide" step for future transport. The "transport carbon" step involves transporting carbon from the vicinity of the "energy as available" sub-system to the vicinity of the "energy on demand" sub-system. The "store carbon for use" step involves storing carbon for future use in the vicinity of the "energy on demand" sub-system. All of these steps are optional.

The "store produced oxygen" step involves storing oxygen produced from the "reduce carbon oxide" step for future transport. The "transport oxygen" step involves transporting oxygen from the vicinity of the "energy as available"

sub-system to the vicinity of the "energy on demand" sub-system. The "store oxygen for use" step involves storing oxygen for future use in the vicinity of the carbon oxidation step. All of these steps are optional.

In some embodiments of the invention relating to FIG. 2, renewable energy at the location of "energy as available" is converted to electricity when the renewable energy is available. As electricity is generated, it is used to chemically reduce carbon dioxide, stored at the location of "energy as available," to carbon and oxygen. The carbon, essentially captured renewable energy, is stored in the vicinity of the "energy as available" until it is transported to the vicinity of "energy on demand," where it is stored for use in the carbon oxidation step. As useful energy is needed, such as in response to a dynamic demand for energy, the stored carbon may be oxidized using air from the atmosphere or transported oxygen (from the carbon oxide reduction). Oxygen oxidizes the carbon, releasing carbon oxide and the energy of reaction, such as heat, which may be converted to electricity as the preferred form of useful energy, by means well-understood by one skilled in the art. In principle, the oxygen from the atmosphere could be purified oxygen from air, or oxygen-enriched air.

Figure 3:
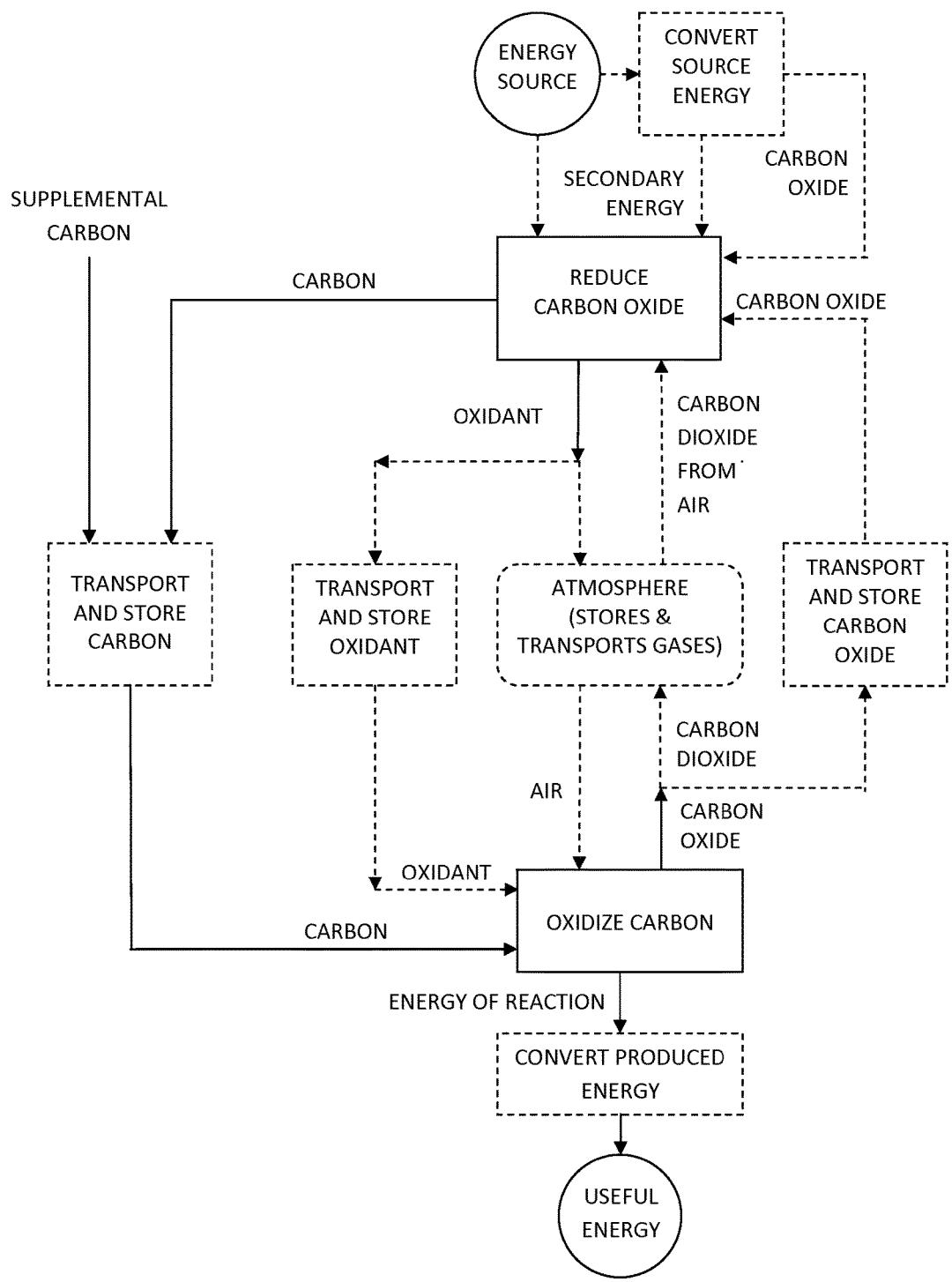
FIG. 3 is a process block-flow diagram depicting some embodiments of the invention utilizing supplemental carbon.

FIG. 3 is a process block-flow diagram depicting some embodiments of the invention utilizing supplemental carbon, to transform energy as available to energy on demand. The FIG. 3 diagram uses circles for inputs and outputs, rectangles for process steps, lines with arrows to show the flow of material and energy, and rounded rectangles for material sources and sinks. Items that are optional are denoted with dashed lines. In FIG. 3, the energy source may be any form of energy, generally a primary energy source. The energy source is preferably a renewable energy source. "Secondary energy" is an optional form of energy generated from the energy source. Secondary energy is generally thermal or electrical energy, but may be other forms of energy.

Figure 4:
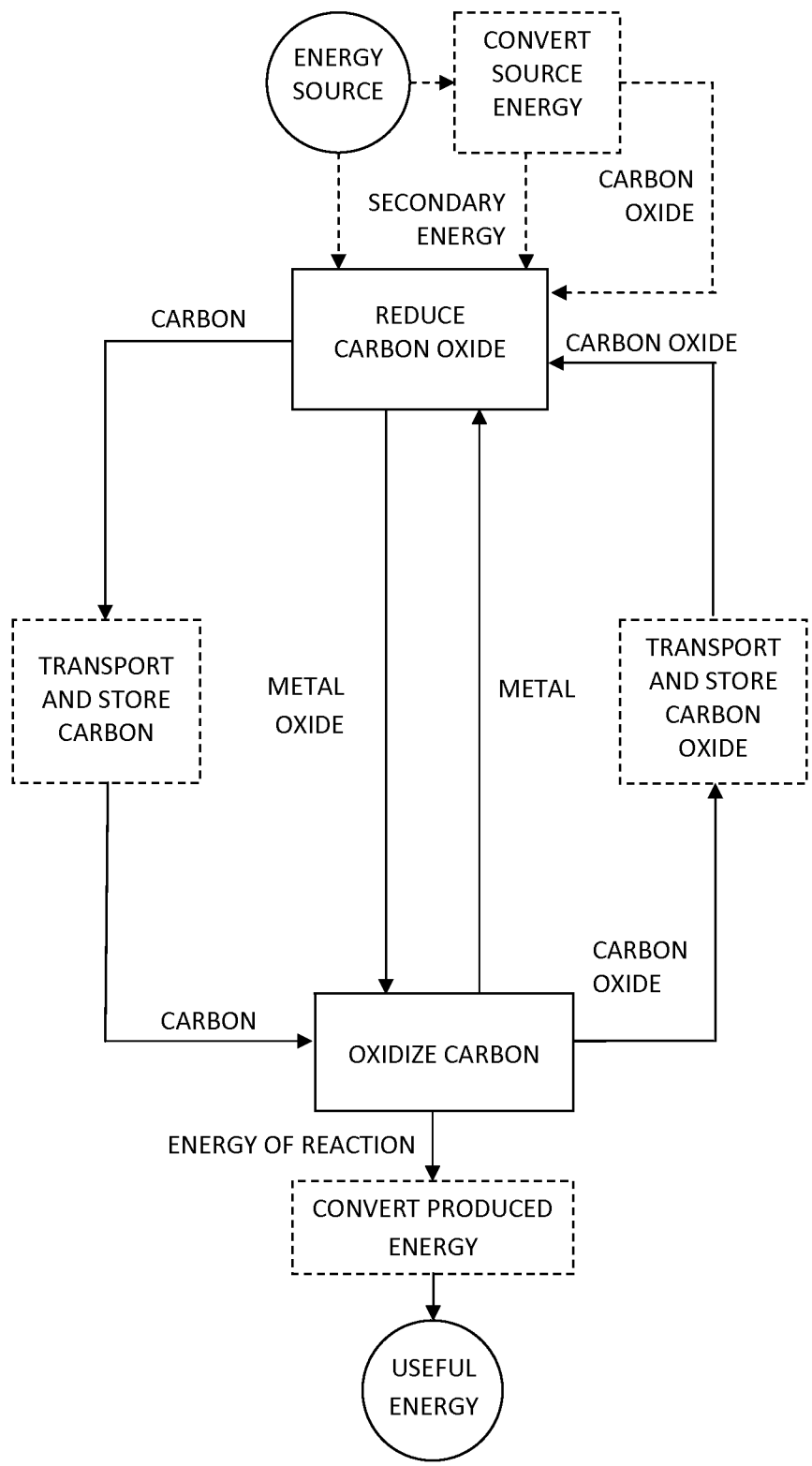
FIG. 4 is a process block-flow diagram depicting some embodiments of the invention utilizing metals and oxides.

FIG. 4 is a process block-flow diagram depicting some embodiments of the invention utilizing metals and metal oxides, to transform energy as available to energy on demand. The FIG. 4 diagram uses circles for inputs and outputs, rectangles for process steps, lines with arrows to show the flow of material and energy, and rounded rectangles for material sources and sinks Items that are optional are denoted with dashed lines. In FIG. 4, the energy source may be any form of energy, generally a primary energy source. The energy source is preferably a renewable energy source.

Figure 5:
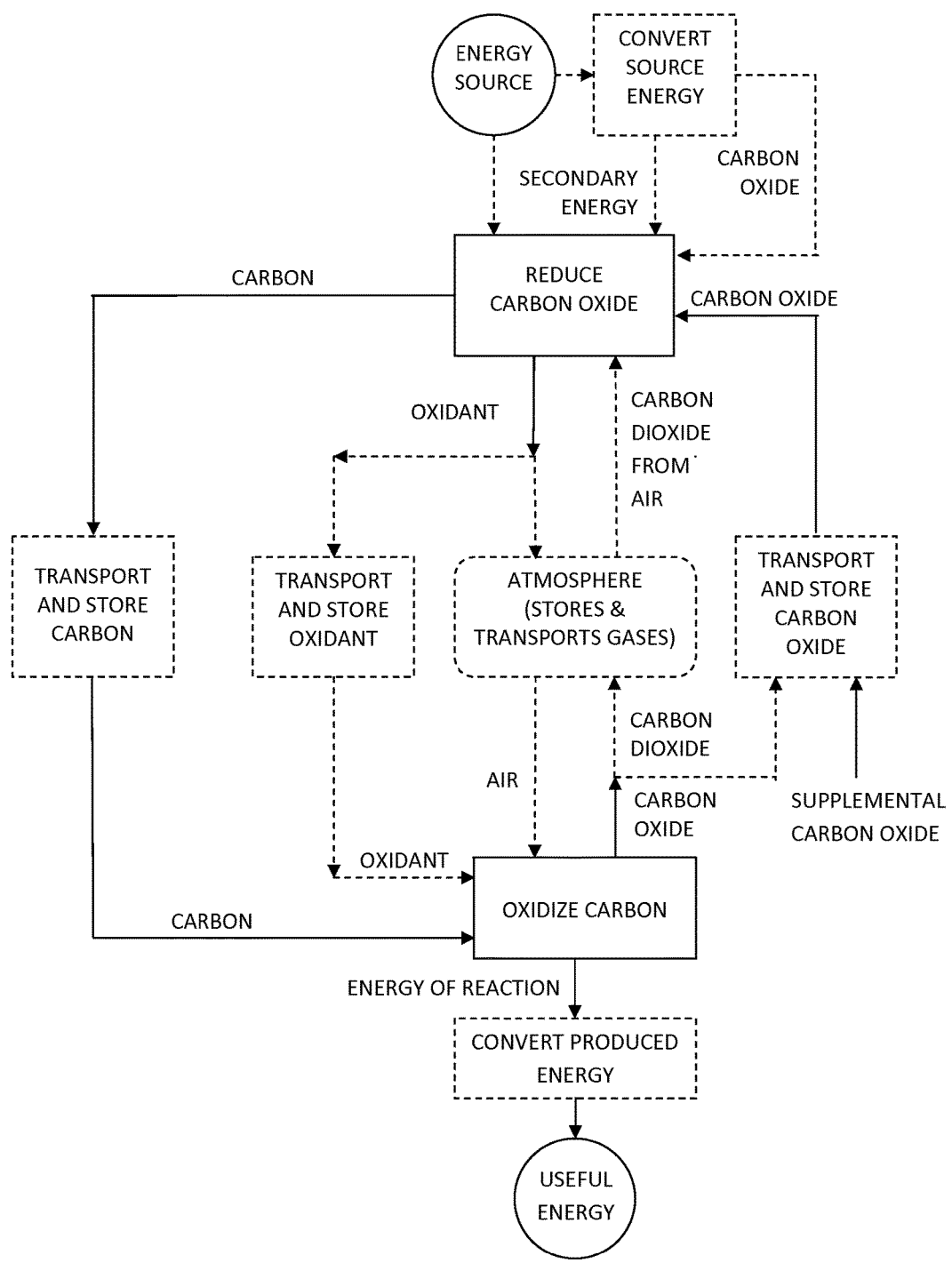
FIG. 5 is a process block-flow diagram depicting some embodiments of the invention utilizing supplemental carbon oxide.

FIG. 5 is a process block-flow diagram depicting some embodiments of the invention utilizing supplemental carbon oxide, to transform energy as available to energy on demand. The FIG. 5 diagram uses circles for inputs and outputs, rectangles for process steps, lines with arrows to show the flow of material and energy, and rounded rectangles for material sources and sinks Items that are optional are denoted with dashed lines. In FIG. 5, the energy source may be any form of energy, generally a primary energy source. The energy source is preferably a renewable energy source. "Secondary energy" is an optional form of energy generated from the energy source. Secondary energy is generally thermal or electrical energy, but may be other forms of energy.

In some embodiments of the invention, the "energy on demand" location is a coal-fired power plant. The invention may virtually eliminate air pollution from coal-fired power plants while improving the utilization of both renewable energy resources and coal-fired power plants.

In some embodiments of the invention, the carbon oxide produced by oxidation is liquefied and stored at the location of "energy on demand" until it is transported to the location of "energy as available." As the stored carbon oxide is used in the carbon oxide reduction step, the cycle starts over again. In some embodiments of the invention, containers used for transporting carbon can also be used for transporting liquid carbon oxide, thereby increasing their utilization and decreasing the incremental cost of transporting liquid carbon oxide.

In some embodiments of the invention, the net effect of this process is that renewable energy, for which the available location, time, and rate cannot be controlled, is rendered dispatchable, being converted to electricity on demand at the location, time and rate needed. The materials used in the process are either virtually recycled via the atmosphere or actually recycled by transporting them between the locations of "energy as available" and "energy on demand." Therefore, the process preferably generates virtually no air pollutants or net carbon dioxide. Air pollutants may arise from transportation of materials. By "no net carbon dioxide" emissions, and the like, it is meant and understood that carbon dioxide losses in the process are inevitable in actual practice.

There are many embodiments, variations, and permutations of this invention, as will be recognized by one skilled in the art or skilled in chemical engineering.

In some embodiments, the energy source is used directly without conversion to chemically reduce carbon, such as by a photocatalytic reaction, which uses photons from sunlight, i.e. solar energy. In some embodiments, the energy source is converted to heat, rather than electricity, for the carbon oxide reduction step.

In some embodiments, the energy source is fossil fuel or, preferably, biomass and is oxidized in the "convert source energy" step, producing energy for the "reduce carbon oxide" step. In these embodiments, the "convert source energy" step also generates carbon oxide, which can be used to replace some or all of the carbon and/or some or all of the carbon oxide lost from the process.

In some embodiments, the carbon oxide reduction step uses carbon dioxide from air, rather than stored carbon oxide. This eliminates the need to transport carbon oxide from the location of energy on demand to the location of energy as available. Carbon dioxide may be recovered directly from the atmosphere by separation means and/or reaction means, as described previously.

Carbon may be transported by whatever means is available, including truck, train, or, perhaps, pipeline (as a slurry). The preferable mode of transportation will depend on the locations of energy as available and energy on demand and availability of the various modes of transportation between locations. If available, train is generally preferred because it has lower energy intensity than truck and is simpler than pipeline, which would likely require slurried carbon. It is possible to create a slurry of carbon in liquid oxygen, in which carbon and oxygen can be transported and, possibly, stored together.

The oxidation step using pure oxygen, rather than air, would provide more usable energy and fewer impurities because the nitrogen in air generally reduces the available energy of reaction and can react to form undesirable byproducts. However, transporting the oxygen, rather than using air from the atmosphere, requires more energy and greater capital cost for transportation. Preferred configurations meet regulatory and operating requirements with the lowest total cost. In general, some air will be necessary to replace oxygen lost in storage and transportation.

In some embodiments, energy as available and energy on demand are co-located, so that neither carbon, oxygen, nor carbon oxide are transported, but are stored on location. In this instance, the invention can be used to provide base load leveling for a modified coal-fired power plant. No renewable energy is required, but the invention may increase the utilization of the coal-fired power plant.

In some embodiments, the "oxidize carbon" step is accomplished in a fuel cell, preferably a molten carbonate or solid oxide fuel cell, in which case the energy of reaction is primarily electricity. In these embodiments, the "convert produced energy" step may not be necessary.

In some embodiments, at or near a renewable energy source, generated energy may be used to produce carbon from carbon oxide according to the overall reaction equation:

$$CO_x + M + energy \rightarrow C + MO_x$$

where M=metal/metal oxide. This reaction is endothermic reduction of carbon oxide to carbon using a metal/metal oxide M as a reductant, with oxidation of metal/metal oxide to a metal oxide ($MO_x$) with a higher oxidation state.

At the site of energy on demand, the carbon is oxidized with the metal oxide (from the reduction) as oxidant, to produce carbon oxide, according to the overall reaction equation:

$$C + MO_x \rightarrow CO_x + M + energy$$

This reaction is exothermic oxidation of carbon to produce carbon oxide, with reduction of metal oxide to a metal or metal oxide of a lower oxidation state. The metal/metal oxide may then be reused as a reductant.

The metal/metal oxide M may be or contain an alkali earth metal, an alkaline earth metal, a transition metal, or oxides thereof, for example. The metal/metal oxide M may be selected from the group consisting of iron, nickel, cobalt, molybdenum, copper, zinc, manganese, vanadium, and combinations or oxides thereof.

For example, Ehrensberger, et al., "Production of Carbon from Carbon Dioxide with Iron Oxides and High-Temperature Solar Energy" *Ind. Eng. Chem. Res.* 1997, 36, 645-648, which is incorporated by reference, it was demonstrated that $CO_2$ can be thermally reduced to carbon with concentrated solar energy, to drive reactions between $CO_2$ and iron oxides. Iron oxides are capable of splitting $CO_2$ into C and $O_2$. In this case, the oxidant is actually a metal oxide, not a metal, but it is reduced to a metal oxide having an even higher oxidation state.

A closed reactor is not necessary for the present invention, in certain embodiments. For example, the carbon oxide reduction step could be performed with a large array of metal/metal oxide surfaces, optionally configured with solar input means, so that carbon dioxide is extracted directly from the atmosphere to form carbon and metal oxide. When solar input means are also included, the electricity may drive the carbon oxide reduction, but other energy input may be included. The array then becomes one of metal oxide and carbon, either or both of which may be separated. The reverse may then later be carried out, to oxidize carbon and metal oxide to metal/metal oxide and carbon oxide, producing energy which could utilize a portion of the same solar input means as energy output means. Other types of open reactors are possible.

Some embodiments of the invention provide a process for producing energy on demand, the process comprising:

(a) obtaining carbon oxide;
(b) obtaining a source of available energy;
(c) converting the carbon oxide, in a first reactor operated at effective reduction conditions using the available energy, to a reduced stream comprising carbon and oxygen;
(d) transporting at least a portion of the carbon to a second reactor, with optional intermediate storage of the carbon prior to step (f);
(e) optionally transporting at least a portion of the oxygen to the second reactor, separately from the carbon, and with optional intermediate storage of the oxygen prior to step (f);
(f) in response to a demand for energy, oxidizing at least a portion of the carbon with an oxidant, in the second reactor operated at effective oxidation conditions to generate reaction energy and an oxidized stream comprising produced carbon oxide;
(g) recovering the reaction energy as, and/or converting the reaction energy to, useful energy to satisfy the demand for energy; and
(h) recycling at least some of the produced carbon oxide to step (c) to convert at least some of the produced carbon oxide, in the first reactor operated at effective reduction conditions, to the reduced stream comprising the carbon and the oxygen.

Some embodiments of the invention provide a process for producing energy on demand, the process comprising:

(a) obtaining carbon dioxide;
(b) obtaining a source of available energy;
(c) converting the carbon dioxide, in a first reactor operated at effective reduction conditions using the available energy, to a reduced stream comprising carbon and oxygen;
(d) transporting at least a portion of the carbon to a second reactor, with optional intermediate storage of the carbon prior to step (f);
(e) optionally transporting at least a portion of the oxygen to the second reactor, separately from the carbon, and with optional intermediate storage of the oxygen prior to step (f);
(f) in response to a demand for energy, oxidizing the at least a portion of the carbon with an oxidant, in the second reactor operated at effective oxidation conditions to generate reaction energy and an oxidized stream comprising produced carbon dioxide;
(g) recovering the reaction energy as, and/or converting the reaction energy to, useful energy to satisfy the demand for energy; and
(h) virtually recycling at least some of the produced carbon dioxide to step (c) by the substeps of: (1) discharging at least some of the produced carbon dioxide to the atmosphere; (2) tracking the quantity of discharged carbon dioxide; (3) obtaining an equivalent amount of carbon dioxide directly from the atmosphere or indirectly from a source (e.g., from biomass or coal combustion) that would otherwise be emitted to the atmosphere; and (4) introducing the equivalent amount of carbon dioxide to step (c) such that during step (h), no net carbon dioxide is emitted to the atmosphere.

In some embodiments, carbon sequestration may be utilized for a portion of the carbon produced by carbon oxide reduction. In these embodiments, credits (through various market or regulatory mechanisms) may be obtained, and such credits may be applied so that essentially no net carbon is emitted to the atmosphere or carbon is effectively removed from the atmosphere.

Some embodiments of the invention provide a system for producing energy on demand from available energy, the system comprising:
(a) a source of available energy;
(b) a first reactor, in operable communication with the available energy, capable of converting carbon oxide to a reduced stream comprising carbon and oxygen;
(c) a second reactor capable of oxidizing the carbon to generate reaction energy and an oxidized stream comprising produced carbon oxide;
(d) a carbon transporting means to convey the carbon from the first reactor to the second reactor;
(e) an optional oxygen transporting means to convey the oxygen from the first reactor to the second reactor;
(f) a carbon oxide transporting means to recycle the produced carbon oxide to the first reactor; and
(g) an energy recovery means to recover the reaction energy as, and/or convert the reaction energy to, useful energy to satisfy an external demand for energy.

Some embodiments of the invention provide a system for producing energy on demand from available energy, the system comprising:
a first reactor that converts carbon oxide to carbon and oxygen, wherein the first reactor utilizes available energy;
a second reactor that oxidizes the carbon with an oxidant to generate useful energy on demand, wherein the oxidant optionally includes the oxygen;
a physical carbon management subsystem for conveying the carbon from the first reactor to the second reactor;
a physical or virtual oxygen management subsystem for conveying the oxygen from the first reactor to the second reactor; and
a physical or virtual carbon oxide management subsystem for recycling the carbon oxide from the second reactor to the first reactor.

Some embodiments of the invention provide a process for producing energy on demand from available energy, the method comprising:
in a first reactor, converting carbon oxide to carbon and oxygen, wherein the first reactor utilizes available energy;
in a second reactor, oxidizing the carbon with an oxidant to generate useful energy on demand, wherein the oxidant optionally includes the oxygen;
physically conveying the carbon from the first reactor to the second reactor;
physically or virtually conveying the oxygen from the first reactor to the second reactor; and
physically or virtually recycling the carbon oxide from the second reactor to the first reactor.

Commercially available apparatus and equipment, known to one of skill in the art, may be employed for the processes of the invention.

The carbon oxide reduction and carbon oxidation steps are typically carried out in reactors. As will be understood, any of the reactors discussed herein can be independent reactors, or alternatively a single reactor can include a plurality of zones, or a combination thereof.

When a single reactor is employed, multiple zones can be present. Multiple zones, such as two, three, four, or more zones, can allow for the separate control of temperature, solids residence time, gas residence time, gas composition, flow pattern, and/or pressure in order to adjust the overall process performance.

References to "zones" shall be broadly construed to include regions of space within a single physical unit, physically separate units, or any combination thereof. For example, the demarcation of zones within a reactor may relate to structure, such as the presence of flights or distinct heating elements to provide heat to separate zones. Alternatively, or additionally, in various embodiments, the demarcation of zones may relate to function, such as distinct temperatures, fluid flow patterns, solid flow patterns, and extent of reaction. It will be appreciated that there are not necessarily abrupt transitions from one zone to another zone. In a single batch reactor, "zones" are operating regimes in time, rather than in space. Various embodiments include the use of multiple batch reactions.

Some embodiments promote additional carbon formation by including a separate unit or zone in which cooled carbon is subjected to an environment including carbon-containing species, such as supplemental carbon, to increase the quantity of carbon.

There are a large number of options as to intermediate input and output streams of one or more phases present in any particular reactor, various mass and energy recycle schemes, various additives that may be introduced anywhere in the process, adjustability of process conditions including both reaction and separation conditions in order to tailor product distributions, and so on. Zone or reactor-specific input and output streams enable good process monitoring and control, such as through FTIR sampling and dynamic process adjustments.

In various embodiments, chemical reactions continue to occur in a cooling zone. It should be appreciated that in various embodiments, some reactions are actually initiated in the cooling zone. For example, the cooling zone may be a "carbon collection zone" in which carbon is formed and/or collected following formation. Carbon-containing components that are in the gas phase can condense (due to the reduced temperature of the cooling zone). The temperature remains sufficiently high, however, to promote reactions that may form additional carbon. One exemplary reaction that may take place is the conversion of carbon monoxide to carbon dioxide plus fixed carbon (Boudouard reaction), discussed above.

The residence times of the zones may vary. For a desired amount of reaction, higher temperatures may allow for lower reaction times, and vice versa. The residence time in a continuous reactor is the volume divided by the volumetric flow rate. The residence time in a batch reactor is the batch reaction time, following heating to reaction temperature.

It should be recognized that in multiphase reactor, there are multiple residence times. In the present context, in each zone, there will be a residence time (and residence-time distribution) of both the solids carbon-rich phase and the vapor phase.

The solids residence time may be selected from about 1 millisecond to about 4 hours, depending on the temperature and time desired. The heat-transfer rate, which will depend on the particle or gas type, the physical apparatus, and the heating parameters, will dictate the minimum residence time necessary to allow the solids to reach a predetermined preheat temperature.

The temperature within the reduction reactor may be selected from about −60° C. to about 2,400° C., such as about 31° C.

Depending on the temperature in the reduction reactor, there should be sufficient time to allow the carbon-forming chemistry to take place, following the necessary heat transfer. For short times, the temperature would need to be quite high and could promote generation of vapors and gases derived from the carbon itself, which is to be avoided when the intended intermediate product is solid carbon.

As discussed above, the residence time of the vapor phase may be separately selected and controlled. The vapor residence time of the reactor may be selected from about 1 millisecond to about 1 hour. Short vapor residence times promote fast sweeping of volatiles out of the system, while longer vapor residence times promote reactions of components in the vapor phase with the solid phase.

The mode of operation for any reactor, and overall system, may be continuous, semi-continuous, batch, or any combination or variation of these. In some embodiments, a reactor is a continuous, countercurrent reactor in which reactants and products flow substantially in opposite directions. A reactor may also be operated in batch but with simulated countercurrent flow of vapors, such as by periodically introducing and removing gas phases from the batch vessel.

Also, as discussed previously, a single common reactor may be utilized both for carbon oxide reduction, and then later for carbon oxidation. In such embodiments, typically there will be removal of the oxygen or oxygen-containing species from the reactor, following the reduction reaction. Then, when energy of reaction is desired, an oxidant (which may be the same oxygen or oxygen-containing species that was removed previously, or another oxidant) is introduced to cause combustion or catalytic oxidation, for example. In embodiments in which carbon oxide is reduced with a metal/metal oxide to a metal oxide, it would be possible to remove the carbon product from the reactor, and leave behind the metal oxide. Then when reaction energy is desired, carbon (the same or different carbon) may be introduced for oxidation with the metal oxide to form metal/metal oxide, carbon oxide, and energy.

Various flow patterns may be desired or observed. With chemical reactions and simultaneous separations involving multiple phases in multiple zones, the fluid dynamics can be quite complex. Typically, the flow of solids may approach plug flow (well-mixed in the radial dimension) while the flow of vapor may approach fully mixed flow (fast transport in both radial and axial dimensions). Multiple inlet and outlet ports for vapor may contribute to overall mixing.

The pressure in each reactor or zone may be separately selected and controlled. The pressure of each zone may be independently selected from about 1 kPa to about $10^4$ kPa, such as about 7,480 kPa. Independent zone control of pressure is possible when multiple gas inlets and outlets are used, including vacuum ports to withdraw gas when a zone pressure less than atmospheric is desired. Similarly, in a multiple reactor system, the pressure in each reactor may be independently selected and controlled.

A substantially inert sweep gas may be introduced into one or more of reactors or zones. Product gases are then carried away from the zone(s) in the sweep gas, and out of the reactor. The sweep gas may be $N_2$, Ar, He, air, or combinations thereof, for example. The sweep gas may first be preheated prior to introduction, or possibly cooled if it is obtained from a heated source.

In certain embodiments, the sweep gas in conjunction with a relatively low process pressure, such as atmospheric pressure, provides for fast vapor removal without large amounts of inert gas necessary. In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

In some embodiments, the zone or zones in which separation is carried out is a physically separate unit from the reactor. The separation unit or zone may be disposed between zones, if desired. For example, there may be a separation unit placed between reactors.

The sweep gas may be introduced continuously, especially when the output solids flow is continuous. When the reaction is operated as a batch process, the sweep gas may be introduced after a certain amount of time, or periodically, to remove gases. Even when the reaction is operated continuously, the sweep gas may be introduced semi-continuously or periodically, if desired, with suitable valves and controls.

The yield of carbon from carbon oxide may vary, depending on the above-described factors including type of feedstock and process conditions. In some embodiments, the net conversion of starting $CO_x$ to carbon is at least 50%, 55%, 60%, 65%, 70%, 75%, 80%, 85%, 90%, 95%, 99% or higher.

Various additives may be introduced throughout the process, before, during, or after any step disclosed herein. The additives may be broadly classified as process additives, selected to improve process performance such as carbon yield or time/temperature to achieve a desired carbon yield. The additive may be added at any suitable time during the entire process.

Additives may be incorporated at supply facilities, transport trucks, unloading equipment, storage bins, conveyors (including open or closed conveyors), dryers, process heaters, or any other units. Additives may be added anywhere into the process itself, using suitable means for introducing additives.

In some embodiments, an additive is selected from a metal, a metal oxide, a metal hydroxide, or a combination thereof. In some embodiments, an additive is selected from an acid, a base, or a salt thereof.

The additives may be applied as a solid powder, a spray, a mist, a liquid, or a vapor. In some embodiments, additives may be introduced through spraying of a liquid solution (such as an aqueous solution or in a solvent), or by soaking in tanks, bins, bags, or other containers.

In some embodiments, a separating step comprises filtration, which may for example utilize fabric filters. In some embodiments, separating comprises electrostatic precipitation. In other embodiments, magnetic separation may be used. Scrubbing (including wet or dry scrubbing) may also be employed.

The throughput, or process capacity, may vary widely from small laboratory-scale units to full commercial-scale operations, including any pilot, demonstration, or semi-commercial scale. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

Solid, liquid, and gas streams produced or existing within the process can be independently recycled, passed to subsequent steps, or removed/purged from the process at any point.

The system may include a purging means for removing oxygen from the system. For example, the purging means may comprise one or more inlets to introduce a substantially inert gas, and one or more outlets to remove the substantially inert gas and displaced oxygen from the system. In some embodiments, the purging means is a deaerater disposed in operable communication with the reduction reactor.

Gas inlets and outlets allow not only introduction and withdrawal of vapor, but gas outlets (probes) in particular allow precise process monitoring and control across various stages of the process. Precise process monitoring would be expected to result in yield and efficiency improvements, both dynamically as well as over a period of time when operational history can be utilized to adjust process conditions.

In some embodiments, a reaction gas probe is disposed in operable communication with a reactor. Such a reaction gas probe may be useful to extract gases and analyze them, in order to determine extent of reaction, selectivity, or other process monitoring. Then, based on the measurement, the process may be controlled or adjusted in any number of ways, such as by adjusting feed rate, rate of inert gas sweep, temperature (of one or more zones), pressure (of one or more zones), and so on.

As intended herein, monitor and control includes any one or more sample extractions via reaction gas probes, and optionally making process or equipment adjustments based on the measurements, if deemed necessary or desirable, using well-known principles of process control (feedback, feedforward, proportional-integral-derivative logic, etc.).

The reactor or reactors may be selected from any suitable reactor configuration that is capable of carrying out the process. Exemplary reactor configurations include, but are not limited to, fixed-bed reactors, fluidized-bed reactors, entrained-flow reactors, augers, rotating cones, rotary drum kilns, moving-bed reactors, or transport-bed reactors. Continuous reactors may be well-mixed or plug-flow, or something between these extremes.

The overall system may be at a fixed location, or it may be made portable. The system may be constructed using modules which may be simply duplicated for practical scale-up. The system may also be constructed using economy-of-scale principles, as is well-known in the process industries.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, chemical activity, molecular weight, density, viscosity, polarity, chemical functionality, affinity to a stationary phase, and any combinations thereof.

Separation of carbon may include filtration (e.g., fabric filters) or electrostatic precipitation (ESP), for example. Fabric filters, also known as baghouses, may utilize engineered fabric filter tubes, envelopes, or cartridges, for example. There are several types of baghouses, including pulse-jet, shaker-style, and reverse-air systems. The separation may also include scrubbing.

An electrostatic precipitator, or electrostatic air cleaner, is a particulate collection device that removes particles from a flowing gas using the force of an induced electrostatic charge. Electrostatic precipitators are highly efficient filtration devices that minimally impede the flow of gases through the device, and can easily remove fine particulate matter from the air stream. An electrostatic precipitator applies energy only to the particulate matter being collected and therefore is very efficient in its consumption of energy (electricity).

The electrostatic precipitator may be dry or wet. A wet electrostatic precipitator operates with saturated gas streams to remove liquid droplets such as sulfuric acid mist from industrial process gas streams. Wet electrostatic precipitators may be useful when the gases are high in moisture content, contain combustible particulate, or have particles that are sticky in nature.

Carbon, hydrogen, and nitrogen may be measured using ASTM D5373 for ultimate analysis, for example. Oxygen may be estimated using ASTM D3176, for example. Sulfur may be measured using ASTM D3177, for example.

Certain embodiments provide carbon intermediate materials with little or essentially no hydrogen (except from any moisture that may be present), nitrogen, phosphorus, or sulfur, and are substantially carbon plus any moisture present. Therefore, some embodiments provide a material with up to and including 100% carbon, on a dry/ash-free (DAF) basis, noting that ash if present would not be expected to derive from the $CO_x$ but may derive from the system itself or impurities that enter the system. Ash may be measured using ASTM D3174, for example.

Various amounts of moisture may be present. On a total mass basis, the carbon material may comprise at least 0.1 wt %, 0.5 wt %, 1 wt %, 2 wt %, 5 wt %, or more of moisture. As intended herein, "moisture" is to be construed as including any form of water present in the carbon product, including absorbed moisture, adsorbed water molecules, chemical hydrates, and physical hydrates. The equilibrium moisture content may vary at least with the local environment, such as the relative humidity. Also, moisture may vary during transportation, preparation for use, and other logistics. Moisture may be measured by any suitable method known in the art, including ASTM D3173, for example.

The carbon material may have various "energy contents" which for present purposes means the energy density based on the higher heating value associated with total combustion of the bone-dry reagent. For example, the carbon may possess an energy content of about at least 12,000 Btu/lb, at least 13,000 Btu/lb, or at least 14,000 Btu/lb. The energy content may be measured by any suitable method known in the art, including ASTM D5865, for example.

The carbon material may be in the form of a powder, such as a coarse powder or a fine powder. The carbon may be further pulverized to form a fine powder. "Pulverization" in this context is meant to include any sizing, milling, pulverizing, grinding, crushing, extruding, or other primarily mechanical treatment to reduce the average particle size. When it is desired to increase bulk density, agglomeration, pelletizing, or compression may be performed on the carbon powder, according to known principles. The mechanical treatments to alter the carbon density may be assisted by chemical or electrical forces, if desired. Such treatments may be batch, continuous, or semi-continuous and may be carried out at a different location than that of formation of the carbon solids, in some embodiments.

In some embodiments, the majority of carbon contained in the carbon material is classified as renewable carbon. In some embodiments, substantially all of the carbon is classified as renewable carbon. There may be certain market mechanisms (e.g., Renewable Identification Numbers, carbon credits, etc.) wherein value is attributed to the renewable carbon content within the carbon material.

Variations of the present invention provide many advantages and features. Some embodiments may realize high theoretical effective energy density compared to alternative processes. Some embodiments may realize high theoretical effective specific energy. Some embodiments may produce and manage renewable energy that is easily and economically stored for long periods of time, and is easily and economically transported.

Embodiments may utilize existing technology and infrastructure for producing, storing, handling, transporting, and using carbon. Carbon is relatively safe. Technology to control and mitigate chemical and biological hazards exists and is widely practiced.

The process of some embodiments of the invention may be used in conjunction with a distributed generation electrical power system. The process of the present invention may be carbon neutral and may be configured to generate little, if any, net carbon dioxide or chemical pollution.

This invention is capable of converting and storing energy in a form that makes it dispatchable, i.e. able to be transported to where it is needed for use when it is needed. The energy carrier provided by the invention is storable. That is, the invention makes practical the storage and dispatch of energy sources that are either not storable and/or not transportable. The energy carrier provided by the invention is practical and widely applicable, especially for electrical power generation. In preferred embodiments, the invention converts and stores renewable energy—rendering renewable energy sources storable and dispatchable.

The utilization of renewable energy source may therefore be increased, by practicing the processes disclosed herein. Also, the invention can decrease the excess conventional electrical generation capacity required to utilize renewable energy sources while ensuring that electrical energy demand is satisfied.

This invention can provide carbon-neutral energy, especially for electrical power generation. This invention can provide a renewable energy carrier that is minimally hazardous, i.e. relatively safe to handle and non-toxic. The energy carrier is also recyclable. This invention can minimize air pollution created by the generation and use energy on demand, especially electricity.

In the U.S., nearly half of electricity is produced by burning coal, which is basically impure carbon. Therefore, utilizing carbon from renewable sources to generate electricity with existing power plants should require minimal changes to existing coal burning power plants. Carbon is already produced, handled, and used industrially in large quantities as carbon black, so the technology and infrastructure for storing, handling and transporting carbon safely and efficiently exists. In addition, carbon has minimal health and safety issues.

Although it is not likely to displace fossil fuels for automobiles, carbon could be used as storable fuel for larger vehicles, such as buses, trucks, trains and ships. In accordance with this invention, carbon can create a sustainable, carbon-neutral process to utilize renewable energy for various applications.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein. In addition to the publications, patents, or patent applications recited above, the following references are hereby incorporated by reference for technical disclosures relating to one or more steps of embodiments of the invention: U.S. Pat. No. 3,810,365, U.S. Pat. No. 5,665,319, and publications US20100018218, US2011290162, US20110260112, CN202485229U, CN103357265, and CN102764577.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A process for transforming energy as available to energy on demand using said energy as available to convert starting carbon oxide to overall reaction products consisting essentially of carbon and diatomic molecular oxygen, separately oxidizing at least some of said carbon to generate said energy on demand and consequent carbon oxide, and employing a plurality of cycles comprising recycling and/or reusing said consequent carbon oxide, either in actuality or virtually via the atmosphere, wherein each of said plurality of cycles includes (i) reducing at least some of said consequent carbon oxide to generate recycled carbon and additional diatomic molecular oxygen, with no other products of overall reaction, and (ii) oxidizing at least some of said recycled carbon to generate additional energy on demand, wherein said process further comprises intermediate storage of said carbon.

2. The process of claim 1, wherein at least a portion of said starting carbon oxide is obtained, directly or indirectly, from said atmosphere.

3. The process of claim 1, wherein said energy as available is selected from the group consisting of fossil-fuel energy, wind energy, solar energy, biomass energy, moving-water energy, geothermal energy, nuclear energy, and combinations thereof.

4. The process of claim 1, wherein said energy as available is renewable energy.

5. The process of claim 1, wherein said energy as available directly provides energy, heat, or work to reduce said carbon oxide to said carbon.

6. The process of claim 1, wherein said energy as available is converted to secondary energy, and wherein said secondary energy provides energy, heat, or work to reduce said carbon oxide to said carbon.

7. The process of claim 6, wherein said secondary energy is electricity.

8. The process of claim 1, wherein said energy as available directly or indirectly provides at least a portion of said carbon oxide to said process.

9. The process of claim 1, wherein said energy as available is biomass energy that is associated with generation of biomass-derived carbon oxide, and wherein said biomass-derived carbon oxide is used as or combined with said carbon oxide.

10. The process of claim 1, wherein said carbon oxide is converted to a reduced stream consisting essentially of said carbon and said diatomic molecular oxygen by a reduction reactor operated at effective reduction conditions.

11. The process of claim 10, wherein said effective reduction conditions are provided by chemical, catalytic, thermal, electrical, dielectrical, ionic, plasma, electrochemical, electromagnetic, or photocatalytic means, or a combination thereof.

12. The process of claim 10, wherein said reduction reactor is selected from the group consisting of a thermal reactor, a catalytic reactor, an electrolysis reactor, a reverse fuel cell, an electrochemical reactor, an electromagnetic reactor, a photocatalytic reactor, a pulsed laser reactor, and a plasma reactor.

13. The process of claim 1, wherein said carbon oxide comprises carbon monoxide, and wherein said effective reduction conditions promote the carbon-forming Boudouard reaction.

14. The process of claim 1, wherein said carbon oxide is converted to a reduced stream consisting essentially of said carbon and said diatomic molecular oxygen in a reduction reactor operated at effective reduction conditions, and wherein said process comprises separating said carbon from said diatomic molecular oxygen in a separation unit that is optionally integrated with said reduction reactor.

15. The process of claim 1, wherein said carbon is densified.

16. The process of claim 1, said process further comprising supplementing said carbon with another carbon source, initially and/or continuously.

17. The process of claim 1, said process further comprising transporting at least a portion of said carbon to an oxidation reactor.

18. The process of claim 17, wherein said at least a portion of said carbon is transported by a transporting means selected from the group consisting of truck, train, ship, barge, pipeline, bulk solids conveyer, and combinations thereof.

19. The process of claim 17, wherein said at least a portion of said carbon is transported by forming a slurry of carbon in liquid oxygen.

20. The process of claim 1, wherein a common reactor is utilized to reduce said carbon oxide to said carbon and then to oxidize said carbon to said consequent carbon oxide.

21. The process of claim 1, wherein said intermediate storage is selected from the group consisting of piles, rail cars, truck trailers, tanks, silos, bins, hoppers, intermediate bulk containers, sacks, drums, and combinations thereof.

22. The process of claim 1, wherein said carbon is oxidized with an oxidant.

23. The process of claim 22, wherein said oxidant includes oxygen is obtained from said oxygen.

24. The process of claim 22, wherein said oxidant is obtained from air.

25. The process of claim 22, wherein said oxidant is a metal oxide or another compound containing a metal and oxygen.

26. The process of claim 22, said process further comprising transporting said oxidant from a reduction reactor to an oxidation reactor.

27. The process of claim 22, said process further comprising intermediate storage of said oxidant.

28. The process of claim 27, wherein storage is selected from the group consisting of a piles, rail cars, truck trailers, tanks, silos, bins, hoppers, intermediate bulk containers, sacks, drums, the atmosphere, and combinations thereof.

29. The process of claim 1, said process comprising oxidation of said carbon in an oxidation reactor operated at effective oxidation conditions to generate reaction energy and an oxidized stream comprising said consequent carbon oxide.

30. The process of claim 29, wherein said oxidation reactor is selected from the group consisting of a boiler, a conventional coal-fired power plant, a modified coal-fired power plant, a non-catalytic combustion unit, a catalytic oxidation reactor, a chemical-looping combustion system, a fuel cell, and an integrated gasification combined cycle unit.

31. The process of claim 30, wherein said oxidation reactor is a molten carbonate or solid oxide fuel cell.

32. The process of claim 29, wherein said reaction energy is directly recovered as said energy on demand.

33. The process of claim 29, wherein said reaction energy is converted to said energy on demand.

34. The process of claim 1, wherein said energy on demand is selected from the group consisting of electrical energy, mechanical energy, thermal energy, chemical energy, electromagnetic energy, and combinations thereof.

35. The process of claim 1, wherein said energy on demand is dispatchable renewable energy and/or distributable renewable energy.

36. The process of claim 1, wherein all of said carbon is oxidized to generate said energy on demand and said consequent carbon oxide.

37. The process of claim 1, wherein said recycling and/or reusing said consequent carbon oxide is in actuality.

38. The process of claim 1, wherein said recycling and/or reusing said consequent carbon oxide is virtually via said atmosphere.

39. The process of claim 1, wherein all of said carbon oxide is provided by said recycling and/or reusing said consequent carbon oxide.

40. The process of claim 1, wherein essentially all (except for process losses) of said consequent carbon oxide is recycled and/or reused.

41. The process of claim 1, said process further comprising intermediate storage of said consequent carbon oxide.

42. The process of claim 41, wherein said storage is selected from the group consisting of rail cars, truck trailers, tanks, silos, bins, hoppers, intermediate bulk containers, sacks, drums, the atmosphere, and combinations thereof.

43. The process of claim 1, wherein said energy as available is co-located with said energy on demand at a single plant site.

44. The process of claim 1, wherein said energy as available and said energy on demand are located at separate plant sites.

45. The process of claim 1, wherein said process generates essentially no net carbon emissions.

46. A process for transforming renewable wind or solar energy as available to dispatchable energy on demand, said process comprising:
(a) using said renewable wind or solar energy as available, in electron, photon, plasma, or thermal form, to reduce carbon oxide to overall reaction products consisting essentially of carbon and diatomic molecular oxygen;
(b) increasing bulk density of said carbon;
(c) storing said carbon;
(d) separately oxidizing at least some of said carbon to generate said energy on demand and consequent carbon oxide; and
(e) recycling and/or reusing said consequent carbon oxide, either in actuality or virtually via the atmosphere,
wherein said process is characterized by essentially zero net carbon emissions.

* * * * *